(12) United States Patent
Wang et al.

(10) Patent No.: US 12,418,905 B2
(45) Date of Patent: Sep. 16, 2025

(54) UPDATE METHOD AND COMMUNICATIONS APPARATUS

(71) Applicant: Huawei Technologies Co., Ltd., Shenzhen (CN)

(72) Inventors: Hui Wang, Shanghai (CN); Huangping Jin, Shanghai (CN); Shibin Ge, Shanghai (CN); Yiling Yuan, Shanghai (CN); Xiaoyan Bi, Ottawa (CA); Peng Shang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 415 days.

(21) Appl. No.: 17/934,693

(22) Filed: Sep. 23, 2022

(65) Prior Publication Data

US 2023/0019630 A1  Jan. 19, 2023

Related U.S. Application Data

(63) Continuation of application No. PCT/CN2020/081137, filed on Mar. 25, 2020.

(51) Int. Cl.
*H04B 7/0456* (2017.01)
*H04L 5/00* (2006.01)
*H04W 72/044* (2023.01)

(52) U.S. Cl.
CPC ......... *H04B 7/0456* (2013.01); *H04L 5/0092* (2013.01); *H04W 72/044* (2013.01)

(58) Field of Classification Search
CPC ... H04B 7/0456; H04L 5/0092; H04W 72/044
See application file for complete search history.

(56) References Cited

U.S. PATENT DOCUMENTS

| | | | |
|---|---|---|---|
| 2008/0095259 A1* | 4/2008 | Dyer | H04L 1/0631 375/265 |
| 2020/0177249 A1* | 6/2020 | Ramireddy | H04B 7/0673 |
| 2020/0358490 A1* | 11/2020 | Wang | H04B 7/0478 |

FOREIGN PATENT DOCUMENTS

| | | |
|---|---|---|
| CN | 110086732 A | 8/2019 |
| CN | 110474665 A | 11/2019 |
| CN | 110855336 A | 2/2020 |
| EP | 3968533 A1 | 3/2022 |
| WO | 2019144801 A1 | 8/2019 |

* cited by examiner

*Primary Examiner* — Mohammad S Anwar
(74) *Attorney, Agent, or Firm* — Slater Matsil, LLP

(57) ABSTRACT

Embodiments of this application provide an update method and a communications apparatus. The method includes: generating space domain vector update information, where the space domain vector update information is for updating a first group of space domain vectors to obtain a second group of space domain vectors, the space domain vector update information includes a plurality of groups of space domain vector coefficients, and each group of space domain vector coefficients is for performing weighted combination on the first group of space domain vectors, to obtain one space domain vector in the second group of space domain vectors; and sending the space domain vector update information.

20 Claims, 6 Drawing Sheets

UPDATE METHOD AND COMMUNICATIONS APPARATUS

CROSS-REFERENCE TO RELATED APPLICATIONS

This application is a continuation of International Application No. PCT/CN2020/081137, filed on Mar. 25, 2020, the disclosure of which is hereby incorporated by reference in its entirety.

TECHNICAL FIELD

This application relates to the field of wireless communications, and more specifically, to an update method and a communications apparatus.

BACKGROUND

In a massive multiple-input multiple-output (Massive MIMO) technology, a network device may reduce interference between a plurality of users and interference between a plurality of signal streams of a same user through precoding, to help improve signal quality, implement spatial multiplexing, and improve spectrum utilization.

In some communications technologies such as a frequency division duplexing (FDD) technology, there is partial reciprocity between an uplink channel and a downlink channel. The network device may construct a precoding matrix by using a space domain vector and a frequency domain vector obtained based on the partial reciprocity between the uplink channel and the downlink channel and one or more weighting coefficients fed back by a terminal device. However, there is a very large error for the precoding matrix constructed by using the space domain vector and the frequency domain vector obtained based on the reciprocity between the uplink channel and the downlink channel.

SUMMARY

This application provides an update method and a communications apparatus, to update, by using statistical information of a downlink channel, a space domain vector and a frequency domain vector obtained based on reciprocity between an uplink channel and the downlink channel.

According to a first aspect, an update method is provided. The method may be performed by a terminal device or a component (for example, a chip or a chip system) configured in the terminal device.

Specifically, the method includes: generating space domain vector update information, where the space domain vector update information is used to update a first group of space domain vectors to obtain a second group of space domain vectors, the space domain vector update information includes a plurality of groups of space domain vector coefficients, and each group of space domain vector coefficients is used to perform weighted combination on the first group of space domain vectors, to obtain one space domain vector in the second group of space domain vectors; and sending the space domain vector update information.

Based on the technical solution, the terminal device may generate, based on statistics about space domain characteristics of a downlink channel, the space domain vector update information corresponding to the first group of space domain vectors, and send the space domain vector update information to a network device. Further, the network device corrects, based on the space domain vector update information, the first group of space domain vectors obtained based on reciprocity between an uplink channel and the downlink channel, to obtain the second group of space domain vectors, so as to resolve a problem that sparsity of space domain information of the uplink channel and the downlink channel is not high enough. Further, the network device performs downlink channel measurement based on the corrected second group of space domain vectors, to better match a determined precoding matrix with the downlink channel.

With reference to the first aspect, in some implementations of the first aspect, the method further includes: generating frequency domain vector update information, where the frequency domain vector update information is used to update a first group of frequency domain vectors to obtain a second group of frequency domain vectors, the frequency domain vector update information includes a plurality of groups of frequency domain vector coefficients, and each group of frequency domain vector coefficients is used to perform weighted combination on the first group of frequency domain vectors, to obtain one frequency domain vector in the second group of frequency domain vectors; and sending the frequency domain vector update information.

Based on the technical solution, the terminal device may generate, based on the statistics about the space domain characteristics of the downlink channel, the space domain vector update information corresponding to the first group of space domain vectors, generate, based on statistics about frequency domain characteristics of the downlink channel, the frequency domain vector update information corresponding to the first group of frequency domain vectors, and send the space domain vector update information and the frequency domain vector update information to the network device. Further, the network device corrects, based on the space domain vector update information, the first group of space domain vectors obtained based on the reciprocity between the uplink channel and the downlink channel, to obtain the second group of space domain vectors, and may correct, based on the frequency domain vector update information, the first group of frequency domain vectors obtained based on the reciprocity between the uplink channel and the downlink channel, to obtain the second group of frequency domain vectors, so as to resolve a problem that sparsity of the space domain information and frequency domain information of the uplink channel and the downlink channel is not high enough. Further, the network device performs downlink channel measurement based on the corrected second group of space domain vectors and second group of frequency domain vectors, to better match the determined precoding matrix with the downlink channel.

With reference to the first aspect, in some implementations of the first aspect, the space domain vector update information is generated based on space-frequency coefficient information, the space-frequency coefficient information is generated based on at least one group of space-frequency coefficients, the at least one group of space-frequency coefficients corresponds to a first group of space-frequency vectors, each space-frequency vector in the first group of space-frequency vectors is generated based on one space domain vector in the first group of space domain vectors and one frequency domain vector in the first group of frequency domain vectors, and each group of space-frequency coefficients is used to perform weighted combination on the first group of space-frequency vectors, to obtain a precoding vector.

With reference to the first aspect, in some implementations of the first aspect, the frequency domain vector update information is generated based on space-frequency coefficient information, the space-frequency coefficient information is generated based on at least one group of space-frequency coefficients, the at least one group of space-frequency coefficients corresponds to a first group of space-frequency vectors, each space-frequency vector in the first group of space-frequency vectors is generated based on one space domain vector in the first group of space domain vectors and one frequency domain vector in the first group of frequency domain vectors, and each group of space-frequency coefficients is used to perform weighted combination on the first group of space-frequency vectors, to obtain a precoding vector.

With reference to the first aspect, in some implementations of the first aspect, each of the at least one group of space-frequency coefficients is generated based on a group of received reference signals, and the group of reference signals is obtained by performing precoding based on the first group of space-frequency vectors.

With reference to the first aspect, in some implementations of the first aspect, the method further includes: receiving first indication information. The first indication information indicates a location of each space-frequency vector in the first group of space-frequency vectors in space-frequency space.

With reference to the first aspect, in some implementations of the first aspect, frequency of feeding back the space-frequency coefficient is greater than frequency of feeding back the space domain vector update information and the frequency domain vector update information.

With reference to the first aspect, in some implementations of the first aspect, the method further includes: receiving second indication information. The second indication information indicates a group quantity of the plurality of groups of space domain vector coefficients.

Based on the technical solution, when the network device indicates the group quantity of the plurality of groups of space domain vector coefficients, a case in which the group quantity of the space domain vector coefficients determined by the terminal device based on the statistics about the space domain characteristics of the downlink channel changes within a large range may be avoided, to reduce feedback overheads of the terminal device. Further, when the terminal device determines the group quantity of the space domain vector coefficients based on the second indication information, the terminal device may generate the plurality of groups of space domain vector coefficients based on information about the downlink channel.

With reference to the first aspect, in some implementations of the first aspect, the method further includes: receiving second indication information. The second indication information indicates a group quantity of the plurality of groups of space domain vector coefficients and a group quantity of the plurality of groups of frequency domain vector coefficients.

Based on the technical solution, when the network device indicates the group quantity of the plurality of groups of space domain vector coefficients and the group quantity of the plurality of groups of frequency domain vector coefficients, a case in which the group quantity of the space domain vector coefficients determined by the terminal device based on the statistics about the space domain characteristics of the downlink channel and the group quantity of the frequency domain vector coefficients determined based on the statistics about the frequency domain characteristics of the downlink channel change within a large range may be avoided, to reduce feedback overheads of the terminal device. Further, when the terminal device determines the group quantity of the space domain vector coefficients and the group quantity of the frequency domain vector coefficients based on the second indication information, the terminal device may generate the plurality of groups of space domain vector coefficients and the plurality of groups of frequency domain vector coefficients based on information about the downlink channel.

According to a second aspect, an update method is provided. The method may be performed by a network device or a component (for example, a chip or a chip system) configured in a network device.

Specifically, the method includes: receiving space domain vector update information, where the space domain vector update information is used to update a first group of space domain vectors to obtain a second group of space domain vectors, the space domain vector update information includes a plurality of groups of space domain vector coefficients, and each group of space domain vector coefficients is used to perform weighted combination on the first group of space domain vectors, to obtain one space domain vector in the second group of space domain vectors; and obtaining the second group of space domain vectors based on the space domain vector update information.

Based on the technical solution, a terminal device may generate, based on statistics about space domain characteristics of a downlink channel, the space domain vector update information corresponding to the first group of space domain vectors, and send the space domain vector update information to the network device. Further, the network device corrects, based on the space domain vector update information, the first group of space domain vectors obtained based on reciprocity between an uplink channel and the downlink channel, to obtain the second group of space domain vectors, so as to resolve a problem that sparsity of space domain information of the uplink channel and the downlink channel is not high enough. Further, the network device performs downlink channel measurement based on the corrected second group of space domain vectors, to better match a determined precoding matrix with the downlink channel.

With reference to the second aspect, in some implementations of the second aspect, the method further includes: receiving frequency domain vector update information, where the frequency domain vector update information is used to update a first group of frequency domain vectors to obtain a second group of frequency domain vectors, the frequency domain vector update information includes a plurality of groups of frequency domain vector coefficients, and each group of frequency domain vector coefficients is used to perform weighted combination on the first group of frequency domain vectors, to obtain one frequency domain vector in the second group of frequency domain vectors; and obtaining the second group of frequency domain vectors based on the frequency domain vector update information.

Based on the technical solution, the terminal device may generate, based on the statistics about the space domain characteristics of the downlink channel, the space domain vector update information corresponding to the first group of space domain vectors, generate, based on statistics about frequency domain characteristics of the downlink channel, the frequency domain vector update information corresponding to the first group of frequency domain vectors, and send the space domain vector update information and the frequency domain vector update information to the network device. Further, the network device corrects, based on the space domain vector update information, the first group of space domain vectors obtained based on the reciprocity between the uplink channel and the downlink channel, to obtain the second group of space domain vectors, and may correct, based on the frequency domain vector update information, the first group of frequency domain vectors obtained based on the reciprocity between the uplink channel and the downlink channel, to obtain the second group of frequency domain vectors, so as to resolve a problem that sparsity of the space domain information and frequency domain information of the uplink channel and the downlink channel is not high enough. Further, the network device performs downlink channel measurement based on the corrected second group of space domain vectors and second group of frequency domain vectors, to better match the determined precoding matrix with the downlink channel.

With reference to the second aspect, in some implementations of the second aspect, the method further includes: sending first indication information. The first indication information indicates a location of each space-frequency vector in a first group of space-frequency vectors in space-frequency space, and the first group of space-frequency vectors is used to precode a reference signal.

With reference to the second aspect, in some implementations of the second aspect, the method further includes: sending second indication information. The second indication information indicates a group quantity of the plurality of groups of space domain vector coefficients.

Based on the technical solution, when the network device indicates the group quantity of the plurality of groups of space domain vector coefficients, a case in which the group quantity of the space domain vector coefficients determined by the terminal device based on the statistics about the space domain characteristics of the downlink channel changes within a large range may be avoided, to reduce feedback overheads of the terminal device. Further, when the terminal device determines the group quantity of the space domain vector coefficients based on the second indication information, the terminal device may generate the plurality of groups of space domain vector coefficients based on information about the downlink channel.

With reference to the second aspect, in some implementations of the second aspect, the method further includes: sending second indication information. The second indication information indicates a group quantity of the plurality of groups of space domain vector coefficients and a group quantity of the plurality of groups of frequency domain vector coefficients.

Based on the technical solution, when the network device indicates the group quantity of the plurality of groups of space domain vector coefficients and the group quantity of the plurality of groups of frequency domain vector coefficients, a case in which the group quantity of the space domain vector coefficients determined by the terminal device based on the statistics about the space domain characteristics of the downlink channel and the group quantity of the frequency domain vector coefficients determined based on the statistics about the frequency domain characteristics of the downlink channel change within a large range may be avoided, to reduce feedback overheads of the terminal device. Further, when the terminal device determines the group quantity of the space domain vector coefficients and the group quantity of the frequency domain vector coefficients based on the second indication information, the terminal device may generate the plurality of groups of space domain vector coefficients and the plurality of groups of frequency domain vector coefficients based on information about the downlink channel.

According to a third aspect, a communications apparatus is provided, and includes modules or units configured to perform the method in any one of the first aspect and the possible implementations of the first aspect.

According to a fourth aspect, a communications apparatus is provided, and includes a processor. The processor is coupled to a memory, and may be configured to execute instructions in the memory, to implement the method in any one of the first aspect and the possible implementations of the first aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip configured in a terminal device. When the communications apparatus is the chip configured in the terminal device, the communications interface may be an input/output interface.

Optionally, the transceiver may be a transceiver circuit. Optionally, the input/output interface may be an input/output circuit.

According to a fifth aspect, a communications apparatus is provided, and includes modules or units configured to perform the method in any one of the second aspect and the possible implementations of the second aspect.

According to a sixth aspect, a communications apparatus is provided, and includes a processor. The processor is coupled to a memory, and may be configured to execute instructions in the memory, to implement the method in any one of the second aspect and the possible implementations of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver or an input/output interface.

In another implementation, the communications apparatus is a chip configured in a network device. When the communications apparatus is the chip configured in the network device, the communications interface may be an input/output interface.

Optionally, the transceiver may be a transceiver circuit. Optionally, the input/output interface may be an input/output circuit.

According to a seventh aspect, a processor is provided, and includes an input circuit, an output circuit, and a processing circuit. The processing circuit is configured to: receive a signal by using the input circuit, and transmit a signal by using the output circuit, so that the processor performs the method in any one of the first aspect, the second aspect, and the possible implementations of each of the first aspect and the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to an eighth aspect, a processing apparatus is provided, and includes a processor and a memory. The processor is configured to: read instructions stored in the memory, receive a signal by using a receiver, and transmit a signal by using a transmitter, to perform the method in any one of the first aspect, the second aspect, and the possible implementations of each of the first aspect and the second aspect.

Optionally, there are one or more processors, and there are one or more memories.

Optionally, the memory may be integrated into the processor, or the memory and the processor are separately disposed.

In a specific implementation process, the memory may be a non-transitory memory, for example, a read-only memory (ROM). The memory and the processor may be integrated into a same chip, or may be disposed on different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the eighth aspect may be a chip, and the processor may be implemented by using hardware or software. When being implemented by using hardware, the processor may be a logic circuit, an integrated circuit, or the like. When being implemented by using software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (which may also be referred to as code or an instruction), and when the computer program is run, a computer is enabled to perform the method in any one of the first aspect, the second aspect, and the possible implementations of each of the first aspect and the second aspect.

According to a tenth aspect, a computer-readable storage medium is provided. The computer-readable storage medium stores a computer program (which may also be referred to as code or an instruction), and when the computer program is run on a computer, the computer is enabled to perform the method in any one of the first aspect, the second aspect, and the possible implementations of each of the first aspect and the second aspect.

According to an eleventh aspect, a communications system is provided, and includes the foregoing terminal device and network device.

DETAILED DESCRIPTION OF ILLUSTRATIVE EMBODIMENTS

Figure 1:
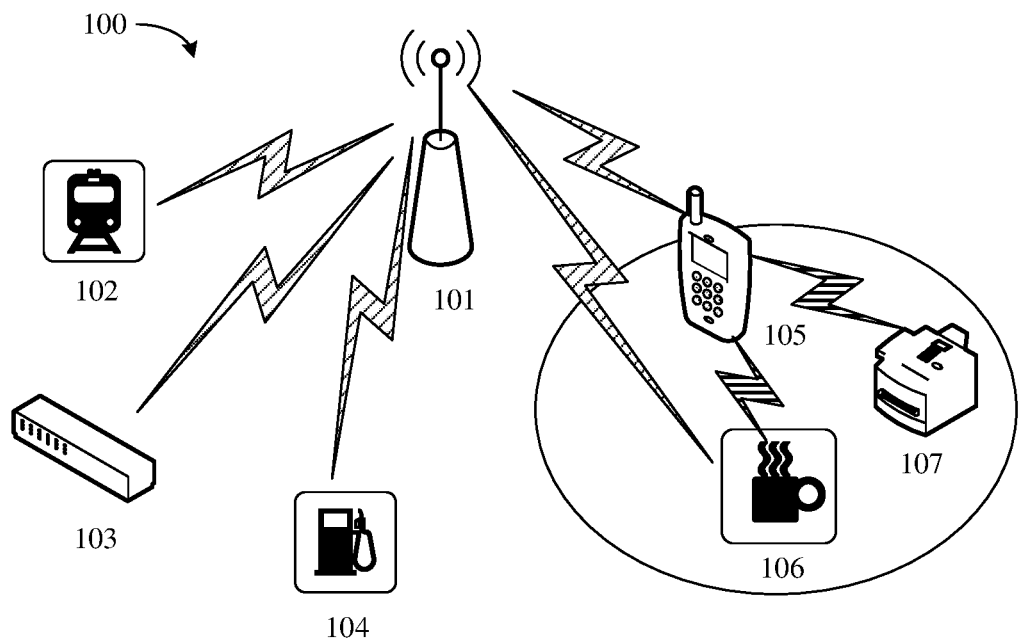
FIG. 1 is a schematic architectural diagram of a communications system applicable to an update method provided in embodiments of this application.

The following describes technical solutions of this application with reference to the accompanying drawings.

The technical solutions in embodiments of this application may be applied to various communications systems, for example, a long term evolution (LTE) system, an LTE frequency division duplex (FDD) system, LTE time division duplex (TDD), a universal mobile telecommunications system (UMTS), a worldwide interoperability for microwave access (WiMAX) communications system, a future 5th generation (5G) mobile communications system, or a new radio access technology (NR). The 5G mobile communications system may include non-standalone (NSA) and/or standalone (SA).

The technical solutions provided in this application may be further applied to machine type communication (MTC), long term evolution-machine type communication (LTE-M), a device-to-device (D2D) network, a machine-to-machine (M2M) network, an internet of things (IoT) network, or another network. The IoT network may include, for example, an internet of vehicles. Communication modes in an internet of vehicles system are collectively referred to as vehicle to X (V2X, where X can stand for anything). For example, V2X may include vehicle-to-vehicle (V2V) communication, vehicle-to-infrastructure (V2I) communication, vehicle-to-pedestrian (V2P) communication, or vehicle-to-network (V2N) communication.

The technical solutions provided in this application may be further applied to a future communications system, for example, a 6th generation mobile communications system. This is not limited in this application.

In embodiments of this application, a network device may be any device with a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), an access point (AP) in a wireless fidelity (Wi-Fi) system, a wireless relay node, a wireless backhaul node, a transmission point (TP), a transmission and reception point (TRP), a gNB or a transmission point (TRP or TP) in a 5G system such as an NR system, one antenna panel or one group of antenna panels (including a plurality of antenna panels) of a base station in a 5G system, or a network node that constitutes a gNB or a transmission point, for example, a baseband unit (BBU) or a distributed unit (DU).

In some deployment, the gNB may include a centralized unit (CU) and the DU. The gNB may further include an active antenna unit (AAU). The CU implements some functions of the gNB, and the DU implements some functions of the gNB. For example, the CU is responsible for processing a non-real-time protocol and a service and implementing functions of a radio resource control (RRC) layer and a packet data convergence protocol (PDCP) layer. The DU is responsible for processing a physical layer protocol and a real-time service and implementing functions of a radio link control (RLC) layer, a medium access control (MAC) layer, and a physical (PHY) layer. The AAU implements some physical layer processing functions, radio frequency processing, and a function related to an active antenna. Information at the RRC layer eventually becomes information at the PHY layer, or is converted from the information at the PHY layer. Therefore, in the architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device provides a service for a cell, and a terminal device communicates with the cell by using a transmission resource (for example, a frequency domain resource, namely, a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, or the like. These small cells are characterized by a small coverage area and low transmit power, and are suitable for providing a high-rate data transmission service.

The terminal device in embodiments of this application may also be referred to as user equipment (UE), an access terminal, a subscriber unit, a subscriber station, a mobile station, a remote station, a remote terminal, a mobile device, a user terminal, a terminal, a wireless communications device, a user agent, a user apparatus, or the like.

The terminal device may be a device that provides voice/data connectivity for a user, for example, a handheld device or a vehicle-mounted device with a wireless connection function. Currently, some examples of the terminal may be a mobile phone, a tablet computer (pad), a computer (for example, a laptop or a palmtop computer) with a wireless transceiver function, a mobile internet device (MID), a virtual reality (VR) device, an augmented reality (AR) device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, a cellular telephone, a cordless telephone, a session initiation protocol (SIP) telephone, a wireless local loop (WLL) station, a personal digital assistant (PDA), a handheld device with a wireless communication function, a computing device, another processing device connected to a wireless modem, a vehicle-mounted device, a wearable device, a terminal device in a 5G network, or a terminal device in a future evolved public land mobile network (PLMN).

The wearable device may also be referred to as a wearable intelligent device, and is a general term for wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may be a terminal device in an internet of things (IoT) system. IoT is an important part of future information technology development. A main technical feature of IoT is to connect things to a network by using a communications technology, to implement an intelligent network in which man and a machine are connected and things are connected. In an IoT technology, massive connections, deep coverage, and power saving of a terminal may be implemented by using, for example, a narrowband (NB) technology.

In addition, the terminal device may further include sensors such as an intelligent printer, a train detector, and a gas station. Main functions include collecting data (some terminal devices), receiving control information and downlink data of a network device, sending an electromagnetic wave, and transmitting uplink data to the network device.

For ease of understanding embodiments of this application, a communications system applicable to a method provided in embodiments of this application is first described in detail with reference to FIG. 1. FIG. 1 is a schematic diagram of a communications system 100 applicable to the method provided in embodiments of this application. As shown in the figure, the communications system 100 may include at least one network device, for example, a network device 101 in a 5G system shown in FIG. 1. The communications system 100 may further include at least one terminal device, for example, terminal devices 102 to 107 shown in FIG. 1. The terminal devices 102 to 107 may be mobile or fixed. The network device 101 may communicate with one or more of the terminal devices 102 to 107 by using a radio link. Each network device may provide communication coverage for a specific geographical area, and may communicate with a terminal device located in the coverage area. For example, the network device may send configuration information to the terminal device, and the terminal device may send uplink data to the network device based on the configuration information. For another example, the network device may send downlink data to the terminal device. Therefore, the network device 101 and the terminal devices 102 to 107 in FIG. 1 constitute a communications system.

Optionally, the terminal devices may directly communicate with each other. For example, the terminal devices may directly communicate with each other by using a D2D technology. As shown in the figure, terminal devices 105 and 106 and terminal devices 105 and 107 may directly communicate with each other by using the D2D technology. The terminal device 106 and the terminal device 107 may independently or simultaneously communicate with the terminal device 105.

Each of the terminal devices 105 to 107 may further communicate with the network device 101, for example, may directly communicate with the network device 101. For example, the terminal devices 105 and 106 in the figure may directly communicate with the network device 101. Alternatively, each of the terminal devices 105 to 107 may indirectly communicate with the network device 101. For example, the terminal device 107 in the figure communicates with the network device 101 by using the terminal device 106.

It should be understood that FIG. 1 shows an example in which there is one network device, a plurality of terminal devices, and a communications link between communications devices. Optionally, the communications system 100 may include a plurality of network devices, and a coverage area of each network device may include another quantity of terminal devices, for example, more or fewer terminal devices. This is not limited in this application.

A plurality of antennas may be configured for each of the communications devices such as the network device 101 and the terminal devices 102 to 107 in FIG. 1. The plurality of antennas may include at least one transmit antenna configured to send a signal and at least one receive antenna configured to receive a signal. In addition, each communications device further includes a transmitter chain and a receiver chain. A person of ordinary skill in the art may understand that each communications device may include a plurality of components (for example, a processor, a modulator, a multiplexer, a demodulator, a demultiplexer, or an antenna) related to signal sending and receiving. Therefore, the network device and the terminal device may communicate by using a multi-antenna technology.

Optionally, the wireless communications system 100 may further include other network entities such as a network controller and a mobility management entity. This is not limited in embodiments of this application.

To better understand embodiments of this application, the following descriptions are first provided.

First, for ease of understanding, meanings expressed by letters in the following description are briefly described herein.

N represents a quantity of frequency domain units, and N is a positive integer.

$N_f$ represents a quantity of sub-bands, and $N_f$ is a positive integer. In a possible design, a frequency domain unit is a sub-band. In this case, $N=N_f$. It should be understood that, that a frequency domain unit is a sub-band is merely a possible design, and should not constitute any limitation on this application. Description is provided below by using a frequency domain unit as a sub-band. In other words, N appearing in the following description may represent the quantity of sub-bands or a quantity of frequency domain units.

The letter n represents an $n^{th}$ sub-band, $0 \leq n \leq N-1$, and n is an integer.

R represents a quantity of receive antenna ports, and R is a positive integer.

The letter r represents an $r^{th}$ receive antenna port, $0 \leq r \leq R-1$, and r is an integer.

$N_t$ represents a quantity of transmit antenna ports in one polarization direction, and $N_t$ is a positive integer. If a transmit antenna in two polarization directions is configured for a network device, in other words, a quantity of polarization directions of the transmit antenna is 2, a quantity of transmit antenna ports in the two polarization directions is $2N_t$.

B represents a quantity of space domain vectors included in a first group of space domain vectors, and B is a positive integer.

K represents a quantity of space domain vectors included in a second group of space domain vectors, and K is a positive integer.

T represents a quantity of frequency domain vectors included in a first group of frequency domain vectors, and T is a positive integer.

D represents a quantity of frequency domain vectors included in a second group of frequency domain vectors, and D is a positive integer.

J represents a quantity of space-frequency vectors included in a first group of space-frequency vectors, a quantity of space-frequency vectors determined by using B space domain vectors and T frequency domain vectors, or a quantity of combinations of space domain vectors and frequency domain vectors determined by using B space domain vectors and T frequency domain vectors, and J is a positive integer. A precoded reference signal of each reference signal port is obtained by precoding a reference signal based on one space domain vector and one frequency domain vector, and therefore each reference signal port may correspond to a combination of one space domain vector and one frequency domain vector. Therefore, a quantity of reference signal ports may be J (corresponding to a single-polarized transmit antenna) or 2J (corresponding to a dual-polarized transmit antenna).

$a(\theta_b)$ represents a $b^{th}$ space domain vector in B space domain vectors, where $0 \leq b \leq B-1$, and b is an integer.

$b(\tau_t)$ represents a $t^{th}$ frequency domain vector in T frequency domain vectors, where $0 \leq t \leq T-1$, and t is an integer.

$m(\theta_k)$ represents a $k^{th}$ space domain vector in K space domain vectors, where $0 \leq k \leq K-1$, and k is an integer.

$l(\tau_d)$: represents a $d^{th}$ frequency domain vector in D frequency domain vectors, where $0 \leq d \leq D-1$, and d is an integer.

V represents a real downlink channel, and may represent a matrix whose dimension is a quantity of receive antenna ports multiplied by a quantity of transmit antenna ports. For example, V may be a matrix whose dimension is $R \times N_t$ (corresponding to a single-polarized transmit antenna) or a matrix whose dimension is $R \times 2N_t$ (corresponding to a dual-polarized transmit antenna). In embodiments of this application, for ease of differentiation, a real channel corresponding to an $n^{th}$ sub-band is denoted as $V_n$.

H represents a space-frequency matrix determined based on one receive antenna port or a space-frequency matrix corresponding to one receive antenna port. H may represent a matrix whose dimension is a quantity of frequency domain units multiplied by a quantity of transmit antenna ports. For example, H may be a matrix whose dimension is $N \times N_t$ (corresponding to a single-polarized transmit antenna) or a matrix whose dimension is $N \times 2N_t$ (corresponding to a dual-polarized transmit antenna).

S represents a matrix that includes K space domain vectors, for example, $S=[m(\theta_0) \, m(\theta_1) \, \ldots \, m(\theta_{K-1})]$.

S' represents a matrix that includes B space domain vectors, for example, $S'=[a(\theta_0) \, a(\theta_1) \, \ldots \, a(\theta_{B-1})]$.

F represents a matrix that includes D frequency domain vectors, for example, $F=[l(\tau_0) \, l(\tau_1) \, \ldots \, l(\tau_{D-1})]$.

F' represents a matrix that includes T frequency domain vectors, for example, $F'=[b(\tau_0) \, b(\tau_1) \, \ldots \, b(\tau_{T-1})]$.

$C_{DL}$ represents a matrix that includes a group of space-frequency coefficients corresponding to a first group of space-frequency vectors, or represents a coefficient matrix that includes a weighting coefficient corresponding to each of B space domain vectors and each of T frequency domain vectors. Each element in $C_{DL}$ may represent a weighting coefficient of one corresponding space-frequency vector.

$C_1$ represents a coefficient matrix that includes a plurality of groups of space domain vector coefficients, or represents a coefficient matrix that includes a weighting coefficient corresponding to each of K space domain vectors.

$C_2$ represents a coefficient matrix that includes weighting coefficients corresponding to a second group of space-frequency vectors that include each of K space domain vectors and each of T frequency domain vectors, or represents a coefficient matrix that includes a weighting coefficient corresponding to each of K space domain vectors and each of T frequency domain vectors.

$C_3$ represents a matrix that includes a plurality of groups of frequency domain vector coefficients, or represents a coefficient matrix that includes a weighting coefficient corresponding to each of D frequency domain vectors.

Second, in embodiments of this application, for ease of description, during numbering, consecutive numbering may be performed starting from 0. For example, $N_s$ sub-bands may include a $0^{th}$ sub-band to an $(N_s-1)^{th}$ sub-band, B space domain vectors may include a $0^{th}$ space domain vector to a $(B-1)^{th}$ space domain vector, and T frequency domain vectors may include a $0^{th}$ frequency domain vector to a $(T-1)^{th}$ frequency domain vector. Certainly, a specific implementation is not limited thereto. For example, consecutive numbering may be performed starting from 1. For example, $N_s$ sub-bands may include a first sub-band to an $N_s^{th}$ sub-band, B space domain vectors may include a first space domain vector to a $B^{th}$ space domain vector, and T frequency domain vectors may include a first frequency domain vector to a $T^{th}$ frequency domain vector. For brevity, examples are not listed herein one by one.

It should be understood that the foregoing descriptions are set for ease of describing the technical solutions provided in embodiments of this application, and are not intended to limit the scope of this application.

Third, in this application, there is transformation of a matrix and a vector at a plurality of locations. For ease of understanding, uniform descriptions are provided herein. A superscript H represents a conjugate transpose. For example, $A^H$ represents a conjugate transpose of a matrix (or vector) A.

Fourth, in the following embodiments, embodiments provided in this application are described by using an example in which both a space domain vector and a frequency domain vector are column vectors. However, this should not constitute any limitation on this application. Based on a same idea, a person skilled in the art may further figure out more other possible representation manners.

Fifth, in this application, "used to indicate" may include "used to directly indicate" and "used to indirectly indicate". When indication information is described as being used to indicate A, it may include that the indication information directly indicates A or indirectly indicates A, but it does not mean that the indication information definitely carries A.

Information indicated by the indication information is referred to as to-be-indicated information. In a specific implementation process, there are a plurality of manners of indicating the to-be-indicated information. By way of example but not limitation, the to-be-indicated information may be directly indicated, for example, the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of the plurality of pieces of information may be further identified and indicated uniformly, to reduce indication overheads caused by separately indicating the same information. For example, a person skilled in the art should understand that a precoding matrix includes precoding vectors, and the precoding vectors in the precoding matrix may have a same part in terms of composition or another attribute.

In addition, specific indication manners may be various existing indication manners. By way of example but not limitation, the manners are the foregoing indication manners and various combinations thereof. For specific details of the indication manners, refer to the conventional technology. Details are not described in this specification. It may be learned from the foregoing descriptions that for example, when a plurality of pieces of information of a same type need to be indicated, different information may be indicated in different manners. In a specific implementation process, a required indication manner may be selected based on a specific requirement. The selected indication manner is not limited in embodiments of this application. In this way, the indication manner in embodiments of this application should be understood as covering various methods that can enable a party for which indication is to be performed to learn of the to-be-indicated information.

In addition, there may be another equivalent form for the to-be-indicated information. For example, a row vector may be represented as a column vector, and a matrix may be represented by using a transposed matrix of the matrix. Alternatively, a matrix may be represented in a form of a vector or an array, and the vector or array may be obtained by connecting row vectors or column vectors in the matrix, or the like. The technical solutions provided in embodiments of this application should be understood as covering various forms. For example, some or all of the features in embodiments of this application should be understood as covering various manifestations of the features.

The to-be-indicated information may be sent as a whole, or may be divided into a plurality of pieces of sub-information and separately sent. In addition, sending periods and/or sending occasions of the sub-information may be the same or different. A specific sending method is not limited in this application. The sending periods and/or the sending occasions of the sub-information may be predefined, for example, predefined based on a protocol, or may be configured by sending configuration information by a transmit end device to a receive end device. By way of example but not limitation, the configuration information may include one or a combination of at least two of radio resource control signaling, medium access control (MAC) layer signaling, and physical layer signaling. The radio resource control signaling includes, for example, radio resource control (RRC) signaling. The MAC layer signaling includes, for example, a MAC control element (CE). The physical layer signaling includes, for example, downlink control information (DCI).

Sixth, in the following embodiments, first, second, and various numerical symbols are merely used for distinction for ease of description, and are not intended to limit the scope of embodiments of this application, for example, are used to distinguish between different indication information.

Seventh, "predefined" or "pre-configuration" may be implemented by pre-storing corresponding code or a table in a device (for example, including a terminal device and a network device) or in another manner that may be used to indicate related information. A specific implementation of "predefined" or "pre-configuration" is not limited in this application. "Stored" may mean "stored in one or more memories". The one or more memories may be independently disposed, or may be integrated into an encoder, a decoder, a processor, or a communications apparatus. Alternatively, a part of the one or more memories may be separately disposed, and a part of the one or more memories are integrated into the decoder, the processor, or the communications apparatus. A type of the memory may be a storage medium in any form. This is not limited in this application.

Eighth, a "protocol" in embodiments of this application may be a standard protocol in the communications field, for example, may include an LTE protocol, an NR protocol, and a related protocol applied to a future communications system. This is not limited in this application.

Ninth, "at least one" means one or more, and "a plurality of" means two or more. And/or describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between associated objects. "At least one of the following items (pieces)" or a similar expression thereof indicates any combination of these items, including a single item (piece) or any combination of a plurality of items (pieces). For example, at least one of a, b, and c may indicate a, b, c, a and b, a and c, b and c, or a, b, and c. Each of a, b, and c may be in a singular form or a plural form.

Tenth, in embodiments of this application, descriptions such as "when" and "if" mean that a device (for example, a terminal device or a network device) performs corresponding processing in an objective case, are not intended to limit a time, do not necessarily mean that the device (for example, the terminal device or the network device) is required to perform a determining action in implementation, and do not mean another limitation.

Eleventh, in embodiments of this application, an antenna port is described at a plurality of locations. The antenna port may include a transmit antenna port and a receive antenna port. To avoid ambiguity, the following descriptions are provided herein: The transmit antenna port may be an antenna port that sends a reference signal (for example, a precoded reference signal). Therefore, the transmit antenna port may also be referred to as a reference signal port. The receive antenna port may be an antenna port that receives a reference signal.

In embodiments of this application, the transmit antenna port may be a port of a network device end, and the receive antenna port may be a port of a terminal device end.

Twelfth, in the following embodiments, for ease of description, an update method provided in embodiments of this application is described by using an interaction procedure between a network device and a terminal device as an example, to update a space domain vector or a frequency domain vector.

For ease of understanding embodiments of this application, terms in embodiments of this application are briefly described below.

1. Precoding technology: When a channel state is known, a network device may process a to-be-sent signal by using a precoding matrix that matches the channel state, so that the precoded to-be-sent signal is adapted to a channel, to reduce complexity of eliminating impact between channels by a receiving device. Therefore, precoding processing is performed on the to-be-sent signal, so that received signal quality (for example, a signal to interference plus noise ratio (SINR)) is improved. Therefore, transmission between a sending device and a plurality of receiving devices may be implemented on a same time-frequency resource by using the precoding technology, in other words, multi-user multiple-input multiple-output (MU-MIMO) is implemented. It should be understood that related descriptions of the precoding technology in this specification are merely examples for ease of understanding, and are not intended to limit the protection scope of embodiments of this application. In a specific implementation process, the sending device may perform precoding in another manner. For example, when channel information (for example, which is but is not limited to a channel matrix) cannot be learned of, precoding is performed by using a preset precoding matrix or a weighted processing manner. For brevity, specific content thereof is not described in this specification.

2. Channel reciprocity: In some communication modes such as TDD, an uplink channel and a downlink channel transmit signals on a same frequency domain resource and different time domain resources. Within a short time (for example, a coherence time of channel propagation), it may be considered that the signals on the uplink channel and the downlink channel experience same channel fading. This is reciprocity between the uplink channel and the downlink channel. Based on the reciprocity between the uplink channel and the downlink channel, a network device may measure the uplink channel based on an uplink reference signal, for example, a sounding reference signal (SRS), and may estimate the downlink channel based on the uplink channel, to determine a precoding matrix used for downlink transmission.

When being transmitted through a radio channel, a signal may pass through a plurality of paths from a transmit antenna and then reach a receive antenna. A multipath delay causes frequency selective fading, namely, a change of a frequency domain channel. A delay is a transmission time of a radio signal on different transmission paths, is determined based on a distance and a speed, and has no relationship with a frequency domain of the radio signal. When a signal is transmitted on different transmission paths, there are different transmission delays due to different distances. Physical locations of the network device and a terminal device are fixed, and therefore multipath distributions of the uplink channel and the downlink channel are the same in terms of delay. Therefore, it may be considered that delays on the uplink channel and the downlink channel in an FDD mode are the same or reciprocal.

In addition, an angle may be an angle of arrival (AOA) at which a signal reaches the receive antenna through the radio channel, or may be an angle of departure (AOD) at which a signal is transmitted through the transmit antenna. In embodiments of this application, the angle may be an angle of arrival at which an uplink signal reaches the network device, or may be an angle of departure at which the network device transmits a downlink signal. Transmission paths of the uplink channel and the downlink channel at different frequencies are reciprocal, and therefore it may be considered that the angle of arrival of the uplink reference signal and the angle of departure of the downlink reference signal are reciprocal.

In embodiments of this application, each angle may be represented by using one angle vector, and each delay may be represented by using one delay vector. Therefore, in embodiments of this application, one angle vector may represent one angle, and one delay vector may represent one delay.

3. Reference signal (RS) and precoded reference signal: The reference signal may also be referred to as a pilot, a reference sequence, or the like. In embodiments of this application, the reference signal may be a reference signal used for channel measurement. For example, the reference signal may be a channel state information reference signal (CSI-RS) used for downlink channel measurement, or may be an SRS used for uplink channel measurement. It should be understood that the reference signals listed above are merely examples, and should not constitute any limitation on this application. In this application, a possibility of defining another reference signal in a future protocol to implement a same or similar function is not precluded.

The precoded reference signal may be a reference signal obtained after a reference signal is precoded. Precoding may include beamforming and/or phase rotation. Beamforming may be implemented, for example, by precoding a downlink reference signal based on one or more angle vectors described above, in other words, implemented by performing space domain precoding. Phase rotation may be implemented, for example, by precoding a downlink reference signal based on one or more delay vectors described above, in other words, implemented by performing frequency domain precoding.

In embodiments of this application, the precoding a downlink reference signal based on one or more angle vectors may also be referred to as loading the one or more angle vectors onto the downlink reference signal, to implement beamforming, and the precoding a downlink reference signal based on one or more delay vectors may also be referred to as loading the one or more delay vectors onto the downlink reference signal, to implement phase rotation.

The precoded reference signal in embodiments of this application may include a reference signal on which space domain precoding and frequency domain precoding are performed or a reference signal onto which the angle vector and the delay vector are loaded.

In embodiments of this application, when a reference signal is precoded based on an angle vector $a(\theta_b)$ and a delay vector $b(\tau_t)$, a precoding matrix used to precode the reference signal may be represented as a product of the angle vector and a conjugate transpose of the delay vector, for example, may be represented as $a(\theta_b) \times b(\tau_t)^H$, and a dimension of the matrix may be $N_t \times N$. Alternatively, a precoding matrix used to precode the reference signal may be represented as a Kronecker product of the angle vector and the delay vector, for example, may be represented as $a(\theta_b) \otimes b(\tau_t)$, and a dimension of the matrix may be $N_t \times N$.

It should be understood that the listed mathematical expressions of the angle and the delay are merely examples, and should not constitute any limitation on this application. For example, a precoding matrix used to precode the reference signal may alternatively be represented as a product of the delay vector and a conjugate transpose of the angle vector or a Kronecker product of the delay vector and the angle vector, and a dimension of the matrix may be $N_t \times T$. Alternatively, a precoding matrix used to precode the reference signal may alternatively be represented as a mathematical transformation of the expressions described above. For brevity, examples are not listed herein one by one.

4. An angle vector may also be referred to as a space domain vector, a beam vector, or the like. The angle vector may be understood as a precoding vector used to perform beamforming on a reference signal. If beamforming is performed, a reference signal transmitted by a sending device (for example, a network device) may have specific spatial directivity. Therefore, a process of precoding the reference signal based on the angle vector may also be considered as a space domain precoding process.

If a real downlink channel is denoted as V, V may represent a matrix whose dimension is R×T or R×2T, where R is a quantity of receive antenna ports, $N_t$ is a quantity of transmit antenna ports in one polarization direction, $2N_t$ is a quantity of transmit antenna ports in two polarization directions, and both R and $N_t$ are positive integers. In downlink transmission, a reference signal onto which the angle vector is loaded may be transmitted to a terminal device through the downlink channel, and therefore a channel measured by the terminal device based on a received precoded reference signal is equivalent to a channel onto which the angle vector is loaded. For example, when an angle vector $a(\theta_b)$ is loaded onto the downlink channel V, this may be represented as $Va(\theta_b)$.

A quantity of ports of a precoded reference signal obtained after a reference signal is precoded based on one or more angle vectors may be the same as a quantity of angle vectors. Therefore, if a reference signal corresponding to a transmit antenna port in each polarization direction is precoded based on B angle vectors, a total quantity of ports of precoded reference signals may be 2B, where 2 corresponds to two polarization directions. Therefore, a channel obtained through measurement is a channel on which precoding is performed, and may be represented as a matrix whose dimension is R×2B, where B is a positive integer. It may be understood that if a quantity B of angle vectors is less than a quantity $N_t$ of transmit antenna ports in each polarization direction, dimension reduction of the antenna ports may be implemented by performing space domain precoding, to reduce pilot overheads.

In embodiments of this application, the angle vector may be a vector whose length is $N_t$.

Optionally, the angle vector is a discrete Fourier transform (DFT) vector. The DFT vector may be a vector in a DFT matrix.

Optionally, the angle vector is a conjugate transpose vector of a DFT vector. The conjugate transpose vector of the DFT vector may be a column vector in a conjugate transpose matrix of a DFT matrix.

Optionally, the angle vector is an oversampled DFT vector. The oversampled DFT vector may be a vector in an oversampled DFT matrix.

In a possible design, the angle vector may be, for example, a two-dimensional (2D)-DFT vector $V_{i,m}$ defined in a type II codebook in the NR protocol TS 38.214 release 15 (R15). In other words, the angle vector may be a 2D-DFT vector or an oversampled 2D-DFT vector.

It should be understood that the angle vector is a form that is used to represent an angle and that is provided in this application. The angle vector is named only for ease of distinguishing from a delay vector, and should not constitute any limitation on this application. In this application, a possibility of defining another name in a future protocol to represent a same or similar meaning is not precluded.

5. A delay vector may also be referred to as a frequency domain vector. The delay vector may be a vector used to represent a change rule of a channel in frequency domain. As described above, a multipath delay causes frequency selective fading. It may be learned from Fourier transform that a time delay of a signal in time domain may be equivalent to a phase gradient in frequency domain.

A phase change of the channel in each frequency domain unit is related to a delay, and therefore a phase change rule of the channel in each frequency domain unit may be represented by using the delay vector. In other words, the delay vector may be used to represent a delay characteristic of the channel.

Precoding a reference signal based on the delay vector may essentially mean performing phase rotation on each frequency domain unit in frequency domain based on an element in the delay vector, to pre-compensate, by using a precoded reference signal, for a frequency selective characteristic caused by the multipath delay. Therefore, a process of precoding the reference signal based on the delay vector may be considered as a frequency domain precoding process.

Precoding the reference signal based on different delay vectors is equivalent to performing phase rotation on each sub-band of the channel based on the different delay vectors. In addition, phase rotation may be performed at different angles on reference signals corresponding to different ports on a same sub-band. To distinguish between different delays, a network device may precode the reference signal based on each of T delay vectors.

Optionally, a length of the delay vector is N, N may refer to a quantity of frequency domain units used to carry the reference signal (for example, a reference signal on which no precoding is performed or a precoded reference signal), N≥1, and N is an integer.

For example, a $t^{th}$ delay vector in the T delay vectors may be represented as $b(\tau_t)$, where $$b(\tau_t) = \begin{bmatrix} e^{-j2\pi f_0 \tau_t} \\ e^{-j2\pi f_1 \tau_t} \\ \vdots \\ e^{-j2\pi f_{N-1} \tau_t} \end{bmatrix},$$

t=0, 2, ..., and T−1, T may represent a quantity of delay vectors, and $f_0, f_1, \ldots,$ and $f_{N-1}$ respectively represent carrier frequencies of a first frequency domain unit and a second frequency domain unit to an $N^{th}$ frequency domain unit.

It should be understood that the foregoing examples of a specific form of the delay vector are merely examples, and should not constitute any limitation on this application. For example, the delay vector may be derived from a DFT matrix. The specific form of the delay vector is not limited in this application.

For ease of description, the delay vector is denoted as $b(\tau_t)$ below. Each element in the delay vector may correspond to one delay. The delay vector whose length is N includes elements corresponding to N delays.

In embodiments of this application, if the delay vector is to be loaded onto a channel, the N elements in the delay vector may be respectively loaded onto N frequency domain units, in other words, each element is loaded onto one frequency domain unit. For example, the frequency domain unit may be a sub-band, a resource block (RB), a resource block group (RBG), or a precoding resource block group (PRG). This is not limited in this application.

Optionally, each frequency domain unit is one RB, and each element in the delay vector may be loaded onto one RB. In this case, the length N of the delay vector may be equal to a quantity of RBs in a wideband, and each element in the delay vector corresponds to one RB.

Optionally, each frequency domain unit is one sub-band, and each element in the delay vector may be loaded onto one sub-band. In this case, the length N of the delay vector may be equal to a quantity of sub-bands in a wideband, and each element in the delay vector corresponds to one sub-band.

It should be understood that for ease of understanding, one delay vector is used above as an example to describe a correspondence between an element in the delay vector and a frequency domain unit. However, this should not constitute any limitation on this application. The network device may load one or more delay vectors onto the channel, and each RB may include, for example, one or more resource elements (RE) that can be used to carry the reference signal.

In downlink transmission, a reference signal onto which the delay vector is loaded may be transmitted to a terminal device through a downlink channel, and therefore a channel measured by the terminal device based on a received precoded reference signal is equivalent to a channel onto which the delay vector is loaded. For example, the frequency domain unit is an RB. If frequency domain precoding is performed on the reference signal based on the delay vector whose length is N, the N elements in the delay vector may be separately loaded onto the reference signal carried on N RBs, in other words, the N elements in the delay vector are respectively loaded onto the N RBs. An $n^{th}$ element in the delay vector is loaded onto a channel $V_n$ on an $n^{th}$ RB, for example, this may be represented as $V_n e^{j2\pi f_n \tau_t}$.

It should be understood that a processing manner of precoding the reference signal based on the delay vector is similar to that of space domain precoding, except that a space domain vector (or an angle vector) is replaced with the delay vector.

It should be noted that frequency domain precoding may be performed on the reference signal based on the delay vector before resource mapping is performed, or may be performed after resource mapping is performed. This is not limited in this application.

For ease of understanding, a process of precoding a reference signal based on a delay vector $b(\tau_t)$ is described below in detail with reference to FIG. 2.

Figure 2:
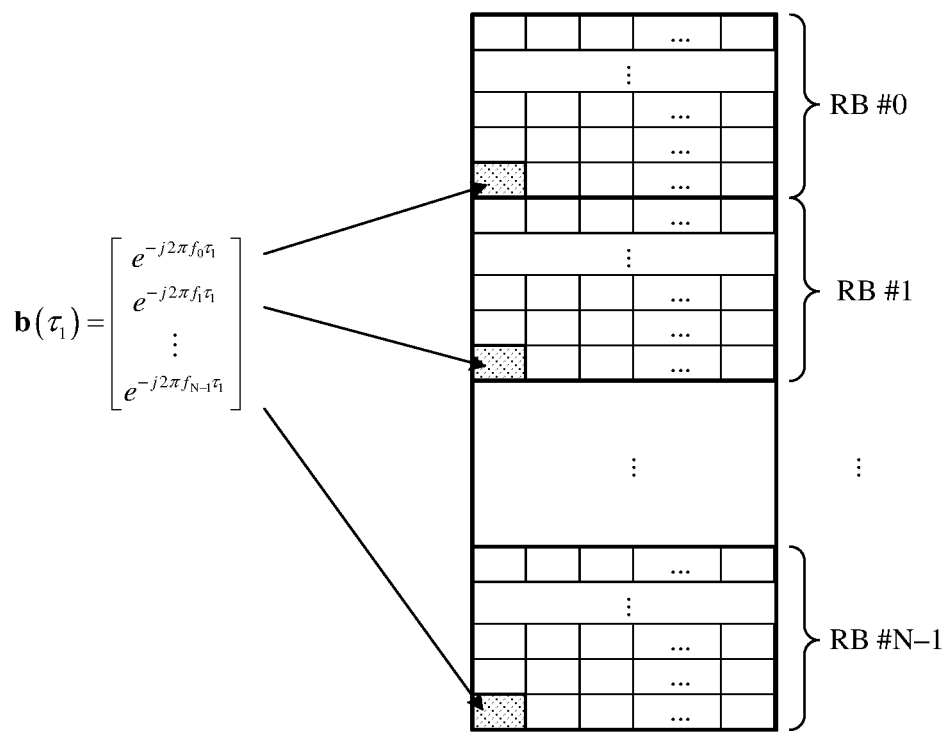
FIG. 2 is a schematic diagram of precoding a reference signal based on a frequency domain vector according to an embodiment of this application.

FIG. 2 shows an example of performing, based on a delay vector $b(\tau_1)$, frequency domain precoding on a reference signal carried on N RBs. The N RBs may include an RB #0 and an RB #1 to an RB #N−1. Each of the N RBs may include one or more REs used to carry the reference signal. For example, the RE used to carry the reference signal may be an RE on a first time domain symbol and a first subcarrier in each RB, as shown by a shaded square in the figure. In this case, the time domain vector $b(\tau_1)$ may be loaded onto the RE on the first time domain symbol and the first subcarrier in each RB. Reference signals carried on REs on first time domain symbols and first subcarriers in the N RBs may correspond to a same reference signal port.

It is assumed that the delay vector is $$b(\tau_1) = \begin{bmatrix} e^{-j2\pi f_0 \tau_1} \\ e^{-j2\pi f_1 \tau_1} \\ \vdots \\ e^{-j2\pi f_{N-1} \tau_1} \end{bmatrix}.$$

If the delay vector $b(\tau_1)$ is to be loaded onto the N RBs, corresponding phase rotation may be performed on the N RBs. N elements in the delay vector may be in a one-to-one correspondence with the N RBs. For example, an element $e^{-j2\pi f_0 \tau_1}$ in the time domain vector $b(\tau_1)$ may be loaded onto the RB #0, an element $e^{-j2\pi f_1 \tau_1}$ in the time domain vector $b(\tau_1)$ may be loaded onto the RB #1, and an element $e^{-j2\pi f_n \tau_1}$ in the delay vector $b(\tau_1)$ may be loaded onto the RB #N−1. By analogy, an $n^{th}$ element $e^{-j2\pi f_n \tau_1}$ in the delay vector $b(\tau_1)$ may be loaded onto an RB #n. For brevity, examples are not listed herein one by one.

It should be understood that FIG. 2 merely shows an example of loading the delay vector $b(\tau_1)$ to the N RBs. However, this should not constitute any limitation on this application. The N RBs used to carry the reference signal in FIG. 2 may be N consecutive RBs or N non-consecutive RBs. This is not limited in this application. Although it is not shown in the figure, it may be understood that each of the RB #0 to the RB #N−1 in FIG. 2 may include one or more REs that can be used to carry the reference signal.

It should be further understood that the delay vector is a form that is used to represent a delay and that is provided in this application. The delay vector is named only for ease of distinguishing from an angle vector, and should not constitute any limitation on this application. In this application, a possibility of defining another name in a future protocol to represent a same or similar meaning is not precluded.

6. An angle-delay pair may also be referred to as a space-frequency vector. The angle-delay pair may be a combination of one angle vector and one delay vector. Each angle-delay pair may include one angle vector and one delay vector. Any two angle-delay pairs include angle vectors and delay vectors that are partially or completely different. In other words, each angle-delay pair may be uniquely determined by using one angle vector and one delay vector.

In embodiments of this application, a weighted sum of one or more angle-delay pairs may be used to determine a space-frequency matrix. A matrix whose dimension is $N_f \times N$ and that is determined based on one angle-delay pair may be referred to as a component of the space-frequency matrix, and may be referred to as a space-frequency component matrix. In the following embodiments, for ease of description, it is assumed that the matrix whose dimension is $N_f \times N$ and that is determined based on the one angle-delay pair is obtained from $a(\theta_b) \times b(\tau_t)^H$.

7. Precoding matrix: In embodiments of this application, the precoding matrix is described at a plurality of locations. Precoding matrices may be classified into two types based on functions of the precoding matrices.

One type of precoding matrix is a precoding matrix used by a network device to precode a reference signal, for example, may be constructed by using the foregoing B angle vectors and T delay vectors.

The other type of precoding matrix is a precoding matrix determined after a terminal device performs channel measurement based on a received precoded reference signal. The precoding matrix may be a precoding matrix fed back by the terminal device to the network device. The precoding matrix is adapted to a downlink channel. The network device may further determine, based on the precoding matrix fed back by the terminal device, a precoding matrix used for downlink data transmission. For example, the network device directly uses the precoding matrix fed back by the terminal device as the precoding matrix used for downlink data transmission, or obtains, by using some beamforming methods such as zero forcing (ZF), a minimum mean square error (MMSE), and a method for maximizing a signal-to-leakage-and-noise ratio (SLNR), the precoding matrix used for downlink data transmission. This is not limited in this application.

A person skilled in the art may understand, with reference to context, meanings expressed by the descriptions of the precoding matrix at a plurality of locations in embodiments of this application.

8. Space-frequency matrix: In embodiments of this application, the space-frequency matrix is an intermediate quantity used to determine a precoding matrix.

In embodiments of this application, the space-frequency matrix may be determined based on a receive port or a transport layer. As described above, the space-frequency matrix may be determined by using a weighted sum of one or more angle-delay pairs. Therefore, a dimension of the space-frequency matrix may also be $N_f \times T$.

If the space-frequency matrix is determined based on the receive port, the space-frequency matrix may be referred to as a space-frequency matrix corresponding to the receive port. The space-frequency matrix corresponding to the receive port may be used to construct a downlink channel matrix of each frequency domain unit, to determine a precoding matrix corresponding to each frequency domain unit. A channel matrix corresponding to a specific frequency domain unit may be, for example, a conjugate transpose of a matrix constructed by using column vectors corresponding to the same frequency domain unit in space-frequency matrices corresponding to all the receive ports. For example, $n^{th}$ column vectors in the space-frequency matrices corresponding to all the receive ports are extracted, and a matrix whose dimension is $N_f \times R$ may be obtained after the vectors are arranged from left to right in an order of the receive ports, where R represents a quantity of receive ports, and R≥1 and is an integer. A channel matrix $V^{(n)}$ of an $n^{th}$ frequency domain unit may be obtained after conjugate transposition is performed on the matrix. A relationship between the channel matrix and the space-frequency matrix is described below in detail, and detailed descriptions of the relationship between the channel matrix and the space-frequency matrix are omitted herein.

The relationship between the space-frequency matrix and the downlink channel matrix and a relationship between the space-frequency matrix and the precoding matrix are briefly described.

The space-frequency matrix is an intermediate quantity that may be used to construct the precoding matrix and that is provided based on frequency domain continuity of a channel. The space-frequency matrix H may meet the following condition: $H=S'CF'^H$.

In an FDD mode, because of delay reciprocity and angle reciprocity on an uplink channel and a downlink channel, a space-frequency matrix $H_{UL}$ obtained through uplink channel measurement may be represented as $H_{UL}=S'C_{UL}F'^H$, and a space-frequency matrix $H_{DL}$ obtained through downlink channel measurement may be represented as $H_{DL}=S'C_{DL}F'^H$. Therefore, in embodiments of this application, a coefficient matrix $C_{DL}$ corresponding to the downlink channel is determined and fed back through downlink channel measurement, to determine a precoding matrix adapted to the downlink channel.

As described above, a space-frequency component matrix is defined to be determined by $a(\theta_b) \times b(\tau_t)^H$, and therefore it may be determined that a dimension of the space-frequency matrix $H_{DL}$ is a quantity of transmit antenna ports multiplied by a quantity of frequency domain units. For example, the dimension of the space-frequency matrix corresponding to the downlink channel is $N_t \times N$. In the following embodiments, if no special description is provided, a space-frequency matrix is the matrix $H_{DL}$ whose dimension is $N_t \times N$.

However, this is not necessarily a space-frequency matrix determined based on a real channel. Usually, a dimension of a channel matrix is defined as a quantity of receive ports multiplied by a quantity of transmit ports. For example, a dimension of the downlink channel is $R \times N_t$. A dimension of a space-frequency matrix determined based on the channel matrix is $N \times N_t$, which is exactly opposite to the dimension $N_t \times N$ of the space-frequency matrix $H_{DL}$. Therefore, in embodiments of this application, the real channel may be a conjugate transpose of a channel matrix determined based on the space-frequency matrix $H_{DL}$. In other words, the downlink channel matrix determined based on the space-frequency matrix $H_{DL}$ may be a conjugate transpose of the real channel.

Further, a precoding matrix may be determined based on the space-frequency matrix $H_{DL}$. A precoding matrix of the $n^{th}$ frequency domain unit may be constructed by using $n^{th}$ column vectors in space-frequency matrices corresponding to all transport layers.

For example, singular value decomposition (SVD) is performed on the channel matrix. A conjugate transpose of the precoding matrix may be obtained after SVD is performed on the channel matrix V. If SVD is performed after conjugate transposition is performed on the channel matrix, in other words, SVD is performed on $V^H$, the precoding matrix may be obtained. Therefore, in embodiments of this application, the precoding matrix corresponding to each frequency domain unit may be directly determined based on the space-frequency matrix $H_{DL}$ determined based on the conjugate transpose of the real channel.

Then, the relationship between the space-frequency matrix and the downlink channel matrix is understood with reference to the formula $H_{UL} = S'C_{UL}F'^H$.

After $H_{DL} = S'C_{DL}F'^H$ is transformed, $S'^H H_{DL} = C_{DL}F'^H$ may be obtained, and after further transformation is performed, $(H_{DL}^H S')^H = C_{DL}F'^H$ may be obtained. Therefore, the coefficient matrix $C_{DL} = (H_{DL}^H S')^H F'$ may be obtained. Herein, $H_{DL}^H$ is the space-frequency matrix determined based on the real channel, and $H_{DL}^H S'$ is a real channel on which space domain precoding is performed. Each element in the coefficient matrix $C_{DL}$ may be determined by multiplying one row in $(H_{DL}^H S')^H$ by one column in F'. In other words, each element in the coefficient matrix $C_{DL}$ may be obtained by multiplying one row in the conjugate transpose $(H_{DL}^H S')^H$ of the real channel $H_{DL}^H S'$ by one column in F', or may be obtained by multiplying a conjugate transpose of one column in the real channel $H_{DL}^H S'$ by one column in F'.

Therefore, in embodiments of this application, the space-frequency matrix $H_{DL}$ determined based on a weighting coefficient of each angle-delay pair fed back by a terminal device may be obtained based on the conjugate transpose of the real channel. On the contrary, the space-frequency matrix in embodiments of this application may be obtained based on the conjugate transpose (namely, $V^H$) of the real channel V.

It should be understood that there is no fixed relationship between the real channel and the space-frequency matrix $H_{DL}$. The relationship between the real channel and the space-frequency matrix $H_{DL}$ may vary with definitions of the space-frequency matrix and the space-frequency component matrix. For example, the space-frequency matrix $H_{DL}$ may be obtained based on the conjugate transpose of the real channel, or may be obtained based on a transpose of the real channel.

An operation performed by a network device to load a delay and an angle and an operation performed by the terminal device to perform channel measurement and feedback correspondingly vary with the definitions of the space-frequency matrix and the space-frequency component matrix. However, this is merely implementation behavior of the terminal device and the network device, and should not constitute any limitation on this application. In embodiments of this application, for ease of understanding, a case in which the space-frequency matrix is obtained based on the conjugate transpose of the real channel is shown. A definition of the channel matrix, the dimension and definition of the space-frequency matrix, and a conversion relationship between the channel matrix and the space-frequency matrix are not limited in this application. Similarly, a conversion relationship between the space-frequency matrix and the precoding matrix is also not limited in this application.

In an FDD system, a spacing between uplink and downlink frequency bands is much greater than a coherent bandwidth, and therefore there is no complete reciprocity between the uplink channel and the downlink channel, and accurate downlink precoding cannot be directly performed by using information about the uplink channel. Therefore, in the FDD system, the network device needs to reconstruct the downlink channel or determine a precoding matrix based on channel state information (CSI) fed back by the terminal device.

Currently, a method for performing CSI measurement by a network device and a terminal device may include, for example, the following operations:

Step 1: The network device sends a channel measurement configuration to the terminal device by using higher layer signaling, to indicate a time and behavior of performing channel measurement by the terminal device.

Step 2: The network device estimates space domain information and frequency domain information of an downlink channel based on information about the uplink channel.

Step 3: The network device loads the obtained space domain information and frequency domain information of the uplink channel onto a downlink pilot, and sends the downlink pilot onto which the space domain information and the frequency domain information are loaded to the terminal device.

Step 4: The terminal device performs channel measurement based on the pilot from the network device, performs calculation to obtain a final CSI feedback quantity, and then sends the obtained CSI feedback quantity to the network device.

Step 5: The network device reconstructs the downlink channel based on the received CSI feedback quantity, and sends downlink data to the terminal device.

However, when there is a timing error for the uplink channel, there is a shift deviation between the frequency domain information estimated by the network device by using the uplink channel and actual frequency domain information of the downlink channel. Further, for a sampling point of the downlink channel, a space-frequency vector estimated based on the uplink channel is not a space-frequency vector with high power of the downlink channel. Therefore, there is a very large error for a precoding matrix constructed by the network device by using space-frequency information obtained based on reciprocity between the uplink channel and the downlink channel.

Based on this, embodiments of this application provide an update method, to update space domain information and frequency domain information obtained based on reciprocity between an uplink channel and a downlink channel, so as to construct a more accurate precoding matrix by using updated space domain information and frequency domain information.

The update method provided in embodiments of this application is described below in detail with reference to the accompanying drawings.

It should be understood that for ease of understanding and description, the method provided in embodiments of this application is described below in detail by using interaction between a terminal device and a network device as an example. However, this should not constitute any limitation on an execution body of the method provided in this application. For example, a terminal device shown in the following embodiments may be replaced with a component (for example, a chip or a chip system) configured in the terminal device, and a network device shown in the following embodiments may be replaced with a component (for example, a chip or a chip system) configured in a network device.

A specific structure of an execution body of the method provided in embodiments of this application is not limited in the following embodiments, provided that a program that records code of the method provided in embodiments of this application can be run to perform communication according to the method provided in embodiments of this application. For example, the method provided in embodiments of this application may be performed by the terminal device or the network device, or a functional module that can invoke and execute the program in the terminal device or the network device.

In the following embodiments, the network device may precode a reference signal based on a frequency domain vector and a space domain vector, or may precode a reference signal based on a frequency domain vector or a space domain vector. This is not limited in this application.

Figure 3:
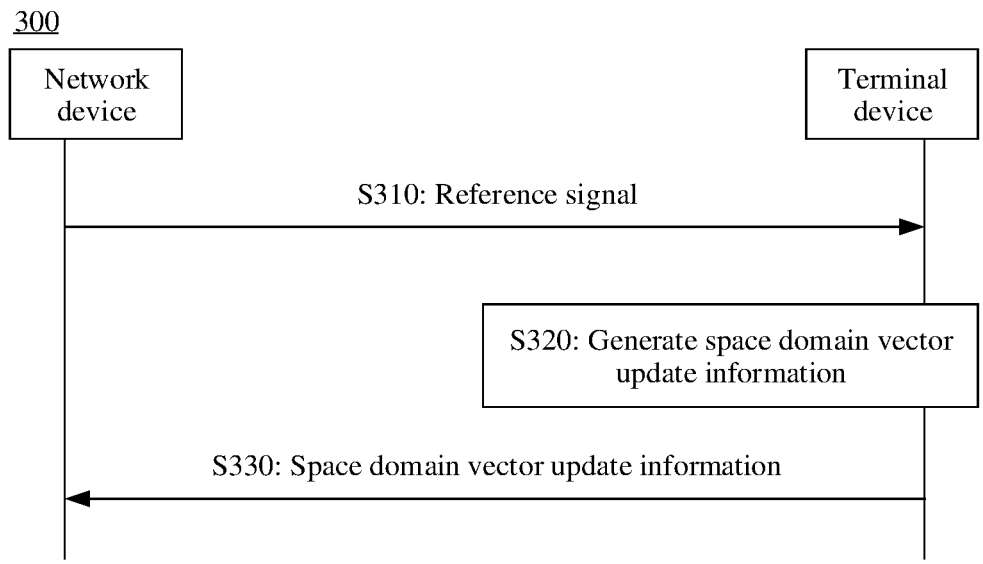
FIG. 3 is a schematic flowchart of an update method according to an embodiment of this application.

FIG. 3 is a schematic flowchart of an update method according to an embodiment of this application. FIG. 3 is a schematic flowchart of an update method 300 according to an embodiment of this application from a perspective of device interaction. The method 300 shown in FIG. 3 may include S310 to S330. The operations in the method 300 are described below in detail.

For ease of understanding, a process in which a terminal device performs channel measurement and feedback is described below in detail by using a precoded reference signal sent by a transmit antenna in one polarization direction as an example. The transmit antenna in the one polarization direction may be a transmit antenna in any one of J polarization directions of the transmit antenna configured for a network device. The quantity J of polarization directions of the transmit antenna configured for the network device is not limited in this application.

S310. The terminal device receives a reference signal. Correspondingly, in S310, the network device sends the reference signal.

For example, the network device may precode a reference signal based on a first group of space domain vectors and a first group of frequency domain vectors. In this case, the reference signal sent by the network device to the terminal device is a precoded reference signal.

An example in which the first group of space domain vectors includes B space domain vectors and the first group of frequency domain vectors includes T frequency domain vectors is used below for description. A plurality of combinations of space domain vectors and frequency domain vectors may be obtained based on the B space domain vectors and the T frequency domain vectors. There are different space domain vectors and/or different frequency domain vectors in any two combinations. A space domain vector and a frequency domain vector in each combination may be used to precode the reference signal, to obtain a precoded reference signal corresponding to one reference signal port. Therefore, precoded reference signals obtained by the network device by performing precoding based on the B space domain vectors and the T frequency domain vectors may correspond to one or more reference signal ports. A precoded reference signal at each reference signal port may be obtained by precoding the reference signal based on one of the B space domain vectors and one of the T frequency domain vectors. In other words, the precoded reference signal of each port may be obtained by precoding the reference signal based on a combination of one space domain vector and one frequency domain vector. In this embodiment of this application, each precoded reference signal may correspond to one reference signal port.

In a possible implementation, the network device may combine each of the B space domain vectors and each of the T frequency domain vectors, to obtain B×T combinations of space domain vectors and frequency domain vectors, in other words, to obtain B×T space-frequency vectors. In other words, the network device may precode the reference signal based on each of the B space domain vectors and each of the T frequency domain vectors. When precoding the reference signal based on a $b^{th}$ ($0 \leq b \leq B-1$, and b is an integer) space domain vector in the B space domain vectors, the network device may precode the reference signal by traversing each of the T frequency domain vectors. Alternatively, when precoding the reference signal based on a $t^{th}$ ($0 \leq t \leq T-1$, and t is an integer) frequency domain vector in the T frequency domain vectors, the network device may precode the reference signal by traversing each of the B space domain vectors. In other words, it may be considered that the B space domain vectors are shared for each frequency domain vector, and it may be considered that the T frequency domain vectors are shared for each space domain vector. In other words, the B space domain vectors and the T frequency domain vectors are mutually shared.

In another possible implementation, when precoding the reference signal based on a $b^{th}$ space domain vector in the B space domain vectors, the network device may precode the reference signal by traversing each of $T_b$ ($0 \leq T_b \leq T-1$, and T is an integer) frequency domain vectors corresponding to the $b^{th}$ space domain vector. T in the T frequency domain vectors may meet the following condition:

$$T \leq \sum_{b=0}^{B-1} T_b.$$

In this implementation, at least two space domain vectors correspond to different frequency domain vectors.

Herein, that at least two space domain vectors correspond to different frequency domain vectors may mean that at least two of the B space domain vectors correspond to different frequency domain vectors, and the other space domain vectors may correspond to a same frequency domain vector or different frequency domain vectors. This is not limited in this application. In other words, the space domain vectors correspond to frequency domain vectors that are partially or completely different.

That two space domain vectors correspond to different frequency domain vectors may mean that the two space domain vectors correspond to frequency domain vectors that are completely different, in other words, there is no overlapping or intersection set between the frequency domain vectors corresponding to the two space domain vectors. For example, a space domain vector $a(\theta_1)$ corresponds to a frequency domain vector $b(\tau_2)$, and a space domain vector $a(\theta_2)$ corresponds to frequency domain vectors $b(\tau_1)$ and $b(\tau_3)$. Alternatively, that two space domain vectors correspond to different frequency domain vectors may mean that the two space domain vectors correspond to frequency domain vectors that are partially different, in other words, the two space domain vectors correspond to frequency domain vectors that partially overlap but are not exactly the same, in other words, there is an intersection set between the frequency domain vectors corresponding to the two space domain vectors, but the frequency domain vectors are not exactly the same. For example, $a(\theta_1)$ corresponds to frequency domain vectors $b(\tau_2)$ and $b(\tau_3)$, and a space domain vector $a(\theta_2)$ corresponds to frequency domain vectors $b(\tau_1)$ and $b(\tau_3)$.

When any two of the B space domain vectors correspond to frequency domain vectors that do not overlap, $$T = \sum_{b=0}^{B-1} T_b.$$

When two or more of the B space domain vectors correspond to frequency domain vectors that partially overlap, $$T < \sum_{b=0}^{B-1} T_b.$$

Therefore, the network device may obtain $$\sum_{b=0}^{B-1} T_b$$

combinations of space domain vectors and frequency domain vectors based on the B space domain vectors and the T frequency domain vectors.

In still another possible implementation, when precoding the reference signal based on a $t^{th}$ frequency domain vector in the T frequency domain vectors, the network device may precode the reference signal by traversing each of $B_t$ ($0 \leq B_t \leq T-1$, and $B_t$ is an integer) space domain vectors corresponding to the $t^{th}$ frequency domain vector. B in the B space domain vectors may meet the following condition:

$$B \leq \sum_{t=0}^{T-1} B_t.$$

In this implementation, at least two frequency domain vectors correspond to different space domain vectors.

Herein, that at least two frequency domain vectors correspond to different space domain vectors may mean that at least two of the T frequency domain vectors correspond to different space domain vectors, and the other frequency domain vectors may correspond to a same space domain vector or different space domain vectors. This is not limited in this application. In other words, the frequency domain vectors correspond to space domain vectors that are partially or completely different.

That two frequency domain vectors correspond to different space domain vectors may mean that the two frequency domain vectors correspond to space domain vectors that are completely different, in other words, there is no overlapping or intersection set between the space domain vectors corresponding to the two frequency domain vectors. For example, a frequency domain vector $b(\tau_1)$ corresponds to a space domain vector $a(\theta_2)$, and a frequency domain vector $b(\tau_2)$ corresponds to a space domain vector $a(\theta_1)$. Alternatively, that two frequency domain vectors correspond to different space domain vectors may mean that the two frequency domain vectors correspond to space domain vectors that are partially different, in other words, the two frequency domain vectors correspond to space domain vectors that partially overlap but are not exactly the same, in other words, there is an intersection set between the space domain vectors corresponding to the two frequency domain vectors, but the space domain vectors are not exactly the same. For example, a frequency domain vector $b(\tau_1)$ corresponds to a space domain vector $a(\theta_2)$, and a frequency domain vector b corresponds to space domain vectors $a(\theta_1)$ and $a(\theta_2)$. When any two of the T frequency domain vectors correspond to space domain vectors that do not overlap, $$B = \sum_{t=0}^{T-1} B_t.$$

When two or more of the T frequency domain vectors correspond to space domain vectors that partially overlap, $$B < \sum_{t=0}^{T-1} B_t.$$

Therefore, the network device may obtain $$\sum_{t=0}^{T-1} B_t$$

combinations of space domain vectors and frequency domain vectors based on the B space domain vectors and the T frequency domain vectors.

It should be understood that a correspondence between the space domain vector and the frequency domain vector is listed above only for ease of understanding. However, this should not constitute any limitation on this application. The correspondence between the space domain vector and the frequency domain vector is not limited in this application.

It may be understood that if the network device precodes the reference signal based on the B space domain vectors and the T frequency domain vectors, a quantity of ports of transmitted precoded reference signals may be a quantity of combinations determined based on the B space domain vectors and the T frequency domain vectors. In other words, the quantity J of reference signal ports may be determined based on the quantity of combinations determined based on the B space domain vectors and the T frequency domain vectors. In the foregoing several different implementations, there are different values for J. For example, J=B×T, J=

$$\sum_{b=0}^{B-1} T_b, \text{ or } J = \sum_{t=0}^{T-1} B_t.$$

For ease of understanding and description, in the following description, it is assumed that J=B×T, that is, each of the B space domain vectors and each of the T frequency domain vectors are combined, to obtain B×T space-frequency vectors. Therefore, the precoded reference signals received by the terminal device correspond to B×T reference signal ports, namely, J reference signal ports.

Optionally, the B space domain vectors and the T frequency domain vectors may be determined based on uplink channel measurement.

Specifically, there is reciprocity between uplink and downlink channels in space domain and frequency domain. Therefore, the network device may determine the B space domain vectors and the T frequency domain vectors based on an uplink channel matrix obtained through pre-estimation.

For example, the network device may estimate the B space domain vectors and the T frequency domain vectors by using a method in the conventional technology. For example, the network device determines the B space domain vectors and the T frequency domain vectors by performing DFT on a space-frequency matrix or by using a joint angle and delay estimation (JADE) algorithm. Specifically, the estimation algorithm may be, for example, a multiple signal classification algorithm (MUSIC), a Bartlett algorithm, or an estimation of signal parameters via rotational invariance technique algorithm (ESPRIT). A specific method for determining the B space domain vectors and the T frequency domain vectors by the network device is not limited in this application.

It may be learned from the foregoing description that a channel obtained by the terminal device by performing measurement based on the received precoded reference signal is not a real channel, but is a channel onto which the space domain vector and the frequency domain vector are loaded, or is a channel on which precoding is performed.

It should be understood that the precoded reference signal is not necessarily obtained by precoding the reference signal based on the B angle vectors and the T delay vectors. In another possible implementation, the network device may perform frequency domain precoding on the reference signal based on the first group of space domain vectors, and a quantity of reference signal ports corresponding to precoded reference signals received by the terminal device may be equal to a quantity of space domain vectors in the first group of space domain vectors, for example, J=B, or may double a quantity of space domain vectors in the first group of space domain vectors, for example, J=2B.

S320. The terminal device generates space domain vector update information.

S330. The terminal device sends the space domain vector update information. Correspondingly, in S330, the network device receives the space domain vector update information.

The space domain vector update information is used to update the first group of space domain vectors to obtain a second group of space domain vectors. The space domain vector update information includes a plurality of groups of space domain vector coefficients, and each group of space domain vector coefficients is used to perform weighted combination on the first group of space domain vectors, to obtain one space domain vector in the second group of space domain vectors.

When being sent to the terminal device through a radio channel, the reference signal passes through the downlink channel. Therefore, the terminal device may detect information about the downlink channel for which there is no complete reciprocity. The terminal device may determine, based on the received reference signal, a weighting coefficient of each space-frequency vector that can be used to construct a precoding matrix adapted to the downlink channel. Specifically, for a method for determining, by the terminal device based on the received precoded reference signal, the weighting coefficient corresponding to each space-frequency vector, refer to the conventional technology. For brevity, details are not described in this embodiment of this application.

For ease of understanding, J space-frequency vectors used by the network device to precode the reference signal are denoted as a first group of space-frequency vectors, and weighting coefficients that are generated by the terminal device and that correspond to the first group of space-frequency vectors are denoted as space-frequency coefficients. As described above, it is assumed that J=B×T. Therefore, a dimension of a coefficient matrix $C_{DL}$ that includes space-frequency coefficients determined by the terminal device based on received precoded reference signals of the J ports may be B×T.

Optionally, before S320, the method 300 may further include: The terminal device receives first indication information. Correspondingly, the network device sends the first indication information to the terminal device.

The first indication information indicates a location of each space-frequency vector in the first group of space-frequency vectors in space-frequency space.

For example, the network device may add the first indication information to physical layer signaling, for example, DCI. Alternatively, the network device may add the first indication information to higher layer signaling, for example, a MAC CE or an RRC message. This is not limited in this application.

For example, if the network device obtains the precoded reference signal by precoding the reference signal based on the B×T space-frequency vectors obtained by combining each of the B space domain vectors and each of the T frequency domain vectors, the first indication information indicates a location of each of the B×T space-frequency vectors in the space-frequency space.

Figure 4:
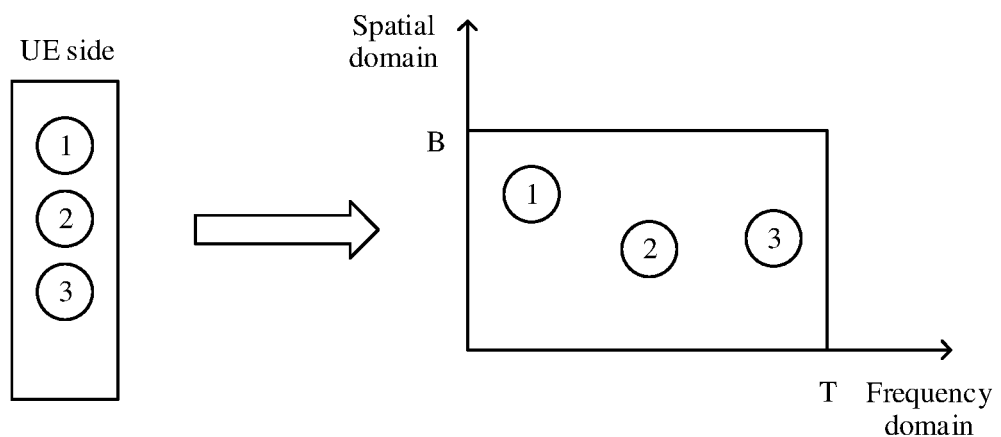
FIG. 4 is a schematic diagram of indicating a location of a space-frequency vector according to an embodiment of this application.

As shown in FIG. 4, after receiving the reference signal from the network device, the terminal device cannot determine specific locations of the B×T space-frequency vectors used to precode the reference signal. To enable the terminal device to determine a specific location, in the coefficient matrix, of a space-frequency coefficient corresponding to each of the B×T space-frequency vectors, the network device may send the first indication information to the terminal device.

Further, the terminal device may generate space-frequency coefficient information based on at least one group of space-frequency coefficients. In this embodiment of this application, a matrix including the space-frequency coefficient information is denoted as C.

In an example, if the terminal device generates the space-frequency coefficient information based on one group of space-frequency coefficients, the space-frequency coefficient information is equivalent to the space-frequency coefficients.

It is assumed that a period in which the terminal device feeds back the space-frequency coefficient is 1 second. In this case, the terminal device generates a group of space-frequency coefficients based on a group of received reference signals in each second, and generates the space-frequency coefficient information based on the group of space-frequency coefficients. Further, the terminal device generates the space domain vector update information based on the space-frequency coefficient information, and sends the space domain vector update information to the network device. It may be understood that in this case, the terminal device feeds back both the space-frequency coefficient and the space domain vector update information, in other words, frequency of feeding back the space-frequency coefficient by the terminal device is equal to frequency of feeding back the space domain vector update information.

In another example, if the terminal device generates the space-frequency coefficient information based on a plurality of groups of space-frequency coefficients, the space-frequency coefficient information may be generated by statistically averaging the plurality of groups of space-frequency coefficients.

It is assumed that a period in which the terminal device feeds back the space-frequency coefficient is 1 second. In this case, the terminal device may generate the space domain vector update information every 2 seconds based on two groups of generated space-frequency coefficients, the terminal device may generate the space domain vector update information every 3 seconds based on three groups of generated space-frequency coefficients, or the terminal device may generate the space domain vector update information at a longer interval. This is not limited in this embodiment of this application.

It is assumed that the terminal device generates the space-frequency coefficient information every 2 seconds. In this case, the terminal device does not generate the space domain vector update information in a first second, and therefore feeds back only the space-frequency coefficient. In a second second, the terminal device generates the space-frequency coefficient information based on two groups of space-frequency coefficients, and generates the space domain vector update information based on the space-frequency coefficient information, and therefore the terminal device feeds back the space-frequency coefficient and the space domain vector update information in the second second. It may be understood that in this case, frequency of feeding back the space-frequency coefficient by the terminal device is greater than frequency of feeding back the space domain vector update information.

Two methods for feeding back the space domain vector update information by the terminal device are listed above. It may be understood that regardless of a manner in which the terminal device feeds back the space domain vector update information, there is a same method for generating, by the terminal device, the space domain vector update information based on the space-frequency coefficient information. An example in which the frequency of feeding back the space-frequency coefficient by the terminal device is greater than the frequency of feeding back the space domain vector update information is used below for description.

It is assumed that the period in which the terminal device feeds back the space-frequency coefficient is 1 second, and a period in which the space domain vector update information is fed back is 3 seconds.

In a first second, the terminal device generates a first group of space-frequency coefficients, which is denoted as $C_{DL}^1$, based on received reference signals of the J ports, and then feeds back $C_{DL}^1$ to the network device.

In a second second, the terminal device generates a second group of space-frequency coefficients, which is denoted as $C_{DL}^2$, based on received reference signals of the J ports, and then feeds back $C_{DL}^2$ to the network device.

In a third second, the terminal device generates a third group of space-frequency coefficients, which is denoted as $C_{DL}^3$, based on received reference signals of the J ports, and then the terminal device generates the space-frequency coefficient information, which is denoted as C, based on the three groups of space-frequency coefficients. For example, $$C = \frac{C_{DL}^1 + C_{DL}^2 + C_{DL}^3}{3}.$$

Further, the terminal device generates the space domain vector update information based on the space-frequency coefficient information.

It should be understood that before generating the space domain vector update information, the terminal device may first determine a group quantity of the space domain vector coefficients based on characteristic space of a statistical covariance matrix of the downlink channel.

Optionally, to avoid a case in which the group quantity of the space domain vector coefficients determined by the terminal device changes within a large range, before S320, the method further includes: The terminal device receives second indication information. The second indication information indicates the group quantity of the space domain vector coefficients. Correspondingly, the network device sends the second indication information.

For example, the network device may add the second indication information to physical layer signaling, for example, DCI. Alternatively, the network device may add the second indication information to higher layer signaling, for example, a MAC CE or an RRC message. This is not limited in this application.

When the terminal device determines the group quantity of the space domain vector coefficients based on the second indication information, the terminal device may generate the space domain vector coefficients based on the space-frequency coefficient information C.

If J=B×T, a dimension of each of $C_{DL}^1$, $C_{DL}^2$, and $C_{DL}^3$ may be B×T, and further, a dimension of C may also be B×T. It is assumed that the group quantity of the space domain vector coefficients indicated in the second indication information is K. Each group of space domain vector coefficients is used to perform weighted combination on the first group of space domain vectors, to obtain one space domain vector in the second group of space domain vectors. Therefore, when the first group of space domain vectors includes the B space domain vectors, a quantity of space domain vector coefficients in each group of space domain vector coefficients is B. In other words, a dimension of a coefficient matrix $C_1$ that includes the K groups of space domain vector coefficients may be B×K.

A relationship between the space-frequency coefficient information C and the space domain vector update information $C_1$ meets the following condition: $C=C_1C_2$.

A relationship between a matrix S' that includes the first group of space domain vectors, a matrix S that includes the second group of space domain vectors, and the space domain vector update information $C_1$ meets the following condition: $S=S'C_1$.

As described above, a space-frequency matrix $H_{DL}$ meets the following condition: $H_{DL}=S'C_{DL}F'^H$. With reference to $C=C_1C_2$ and $S=S'C_1$, $H_{DL}=SC_2F'^H$ may be obtained. Further, after the foregoing formulas are transformed, $C_2=S^H H_{DL} F'$ may be obtained. Therefore, the coefficient matrix $C_2$ may represent a projection coefficient of $H_{DL}$ on S and F', in other words, the coefficient matrix $C_2$ may represent a projection coefficient of a downlink instantaneous channel on S and F'. That is, each element in $C_2$ represents a weighting coefficient corresponding to a space-frequency vector that includes one space domain vector in the second group of space domain vectors and one frequency domain vector in the first group of frequency domain vectors.

Further, the terminal device feeds back the space domain vector update information $C_1$ and the space-frequency coefficient $C_2$ to the network device. That is, the space-frequency coefficients fed back by the terminal device to the network device in the third second are not $C_{DL}^3$ generated based on a received third reference signal in the third second, but are the space-frequency coefficient $C_2$ generated based on the space-frequency coefficient information.

It may be understood that the space-frequency coefficients fed back by the terminal device in the first second and the second second may be used to perform weighted combination on the first group of space-frequency vectors, to obtain a precoding vector. The space-frequency coefficients fed back by the terminal device in the third second may be used to perform weighted combination on a plurality of space-frequency vectors including the second group of space domain vectors and the first group of frequency domain vectors, to obtain a precoding vector.

It may be understood that the reference signals sent by the network device to the terminal device in the first second to the third second are reference signals obtained by performing precoding based on the first group of space domain vectors and the first group of frequency domain vectors.

After the network device receives the space domain vector update information fed back by the terminal device in the third second, the network device may update the first group of space domain vectors based on the space domain vector update information.

For example, the network device may obtain a $k^{th}$ space domain vector $m(\theta_k)=a(\theta_0)c_{1,k,0}+a(\theta_1)c_{1,k,1}+\ldots+a(\theta_{B-1})c_{1,k,B-1}$ in the second group of space domain vectors based on the first group of space domain vectors $S'=[a(\theta_0) a(\theta_1) \ldots a(\theta_{B-1})]$ and a $k^{th}$ group of space domain vector coefficients $c_{1,k}[c_{1,k,0} c_{1,k,1} \ldots c_{1,k,B-1}]^H$ in the space domain vector update information $C_1$, where $0 \le k \le K$.

After calculating the second group of space domain vectors, the network device sends, to the terminal device in a fourth second, a reference signal obtained by performing precoding based on the second group of space domain vectors and the first group of frequency domain vectors. If J=K×T, a dimension of a space-frequency coefficient matrix $C_{DL}^4$ generated by the terminal device based on the received reference signal in the fourth second may be K×T. In this case, when K is less than B, the dimension of the space-frequency coefficient fed back by the terminal device in the fourth second is less than the dimensions of the space-frequency coefficients fed back in the first second and the second second. In other words, when the downlink channel is measured based on the updated space domain vector, feedback overheads of the terminal device may be reduced.

As described above, $S=S'C_1$. After the formula is transformed, $C_1=S'^H S$ may be obtained. Therefore, the space domain vector update information $C_1$ may represent a projection coefficient of S on S'. In other words, the space domain vector update information $C_1$ may represent a projection coefficient of the characteristic space of the statistical covariance matrix of the downlink channel on S'.

It should be noted that a process of generating the space domain vector update information by the terminal device is described above by using one polarization direction and one receive antenna as an example. In other words, the K groups of space domain vector coefficients may be determined based on a precoded reference signal that is sent by a transmit antenna in one polarization direction and that is received by one receive antenna. However, this should not constitute any limitation on this application.

When a plurality of receive antennas are configured for the terminal device, the one receive antenna described in the foregoing example may be any one of the plurality of receive antennas configured for the terminal device. In other words, the terminal device may determine K groups of space domain vector coefficients for each receive antenna based on the foregoing method.

When a transmit antenna in a plurality of polarization directions is configured for the network device, the one polarization direction described in the foregoing example may be any one of the plurality of polarization directions. In other words, the terminal device may determine K groups of space domain vector coefficients based on the foregoing method and a precoded reference signal sent by the transmit antenna in each polarization direction.

Optionally, the space domain vector update information includes R groups of space domain vector update information fed back based on the receive antenna. Each group of space domain vector update information fed back based on the receive antenna corresponds to one receive antenna, and each group of space domain vector update information fed back based on the receive antenna includes K groups of space domain vector coefficients corresponding to the one receive antenna.

It should be understood that it is merely a possible implementation in which the terminal device feeds back the space domain vector update information based on a receive port. This should constitute no limitation on this application.

In another implementation, the terminal device may feed back the space domain vector update information based on a transport layer. In this implementation, in each of the K groups of space domain vector coefficients included in the space domain vector update information, space domain vector coefficients corresponding to each space domain vector may include Z space domain vector coefficients corresponding to Z transport layers.

For ease of understanding, a process in which the terminal device determines the space domain vector update information fed back based on the transport layer is described herein by using space domain vector update information corresponding to two polarization directions as an example.

It is assumed that R space domain vector coefficients correspond to each space domain vector in each group of space domain vector coefficients determined by the terminal device, and correspond to R receive ports. In this case, the space domain vector coefficient information $C_1$ determined by the terminal device based on the receive port may be represented as follows:

$$\begin{bmatrix} c_{1,0,0} & c_{1,0,1} & \cdots & c_{1,0,R-1} \\ c_{1,1,0} & c_{1,1,1} & \cdots & c_{1,1,R-1} \\ \vdots & \vdots & \ddots & \vdots \\ c_{1,K-1,0} & c_{1,K-1,1} & \cdots & c_{1,K-1,R-1} \\ c_{1,K,0} & c_{1,K,1} & \cdots & c_{1,K,R-1} \\ c_{1,K+1,0} & c_{1,K+1,1} & \cdots & c_{1,K+1,R-1} \\ \vdots & \vdots & \ddots & \vdots \\ c_{1,2K-1,0} & c_{1,2K-1,1} & \cdots & c_{1,2K-1,R-1} \end{bmatrix}$$

Coefficient vectors in the first K rows in the matrix correspond to K groups of space domain vector coefficients corresponding to the B space domain vectors in a first polarization direction, and coefficient vectors in the last K rows correspond to K groups of space domain vector coefficients corresponding to the B space domain vectors in a second polarization direction. Coefficient vectors in a $k^{th}$ row and an $r^{th}$ column in the first K rows represent a $k^{th}$ group of space domain vector coefficients corresponding to an $r^{th}$ receive port in the first polarization direction, and coefficient vectors in a $k^{th}$ row and an $r^{th}$ column in the last K rows represent a $k^{th}$ group of space domain vector coefficients corresponding to the $r^{th}$ receive port in the second polarization direction.

For example, the terminal device may perform SVD on the coefficient matrix $C_1$, to obtain space domain vector coefficients fed back based on the transport layer. The space domain vector coefficients determined by the terminal device based on the transport layer may be represented by using a matrix, and may be as follows:

$$\begin{bmatrix} p_{1,0,0} & p_{1,0,1} & \cdots & p_{1,0,Z-1} \\ p_{1,1,0} & p_{1,1,1} & \cdots & p_{1,1,Z-1} \\ \vdots & \vdots & \ddots & \vdots \\ p_{1,K-1,0} & p_{1,K-1,1} & \cdots & p_{1,K-1,Z-1} \\ p_{1,K,0} & p_{1,K,1} & \cdots & p_{1,K,Z-1} \\ p_{1,K+1,0} & p_{1,K+1,1} & \cdots & p_{1,K+1,Z-1} \\ \vdots & \vdots & \ddots & \vdots \\ p_{1,2K-1,0} & p_{1,2K-1,1} & \cdots & p_{1,2K-1,Z-1} \end{bmatrix}$$

Each group of space domain vector coefficients in the coefficient matrix is represented by p, to be distinguished from each group of space domain vector coefficients c fed back based on the receive port. The first K rows in the coefficient matrix may correspond to the first polarization direction, and the last K rows may correspond to the second polarization direction. Z columns correspond to the Z transport layers. Coefficient vectors in a $k^{th}$ row and a $z^{th}$ column in the first K rows represent a $k^{th}$ group of space domain vector coefficients corresponding to a $z^{th}$ transport layer in the first polarization direction, and coefficient vectors in a $k^{th}$ row and a $z^{th}$ column in the last K rows represent a $k^{th}$ group of space domain vector coefficients corresponding to the $z^{th}$ transport layer in the second polarization direction.

It may be learned that the terminal device may determine, based on the space domain vector coefficients that correspond to the B space domain vectors and that are determined based on the receive port, the space domain vector coefficients that correspond to the B space domain vectors and that are fed back based on the transport layer.

The terminal device may generate the space domain vector update information based on space domain vector coefficients of the B space domain vectors corresponding to each transport layer in each polarization direction.

It should be understood that the process in which the terminal device determines the space domain vector update information fed back based on the transport layer is merely an example, and should not constitute any limitation on this application. A specific method for determining, by the terminal device, the space domain vector update information fed back based on the transport layer is not limited in this application.

In this embodiment of this application, the terminal device generates, based on statistics about space domain characteristics of the downlink channel, the space domain vector update information corresponding to the first group of space domain vectors, and sends the space domain vector update information to the network device. Further, the network device corrects, based on the space domain vector update information, the first group of space domain vectors obtained based on reciprocity between an uplink channel and the downlink channel, to obtain the second group of space domain vectors, so as to resolve a problem that sparsity of space domain information of the uplink channel and the downlink channel is not high enough. Further, the network device performs downlink channel measurement based on the corrected second group of space domain vectors, to better match the determined precoding matrix with the downlink channel.

In addition, when a quantity of space domain vectors included in the second group of space domain vectors obtained by the network device based on the space domain vector update information is less than the quantity of space domain vectors included in the first group of space domain vectors, the network device precodes the reference signal based on the second group of space domain vectors, to reduce pilot overheads.

Figure 5:
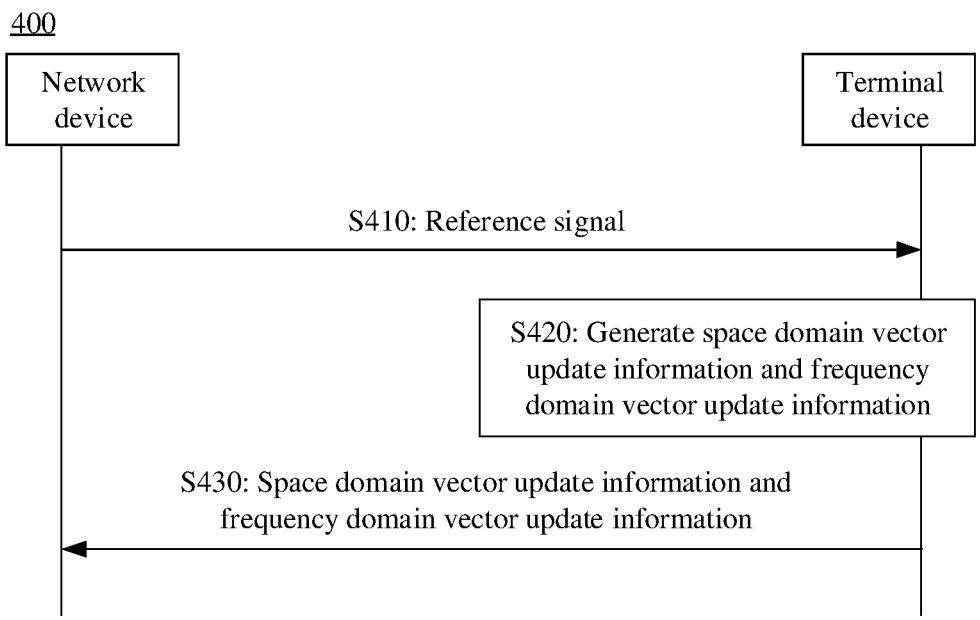
FIG. 5 is a schematic flowchart of an update method according to another embodiment of this application.

FIG. 5 is a schematic flowchart of an update method according to another embodiment of this application. The method 400 shown in FIG. 5 may include S410 to S430. The operations in the method 400 are described below in detail.

S410 in the method 400 is the same as S310 in the method 300. For brevity, details are not described in this embodiment of this application.

S420. A terminal device generates space domain vector update information and frequency domain vector update information.

S430. The terminal device sends the space domain vector update information and the frequency domain vector update information. Correspondingly, in S430, a network device receives the space domain vector update information and the frequency domain vector update information.

The space domain vector update information is used to update a first group of space domain vectors to obtain a second group of space domain vectors. The space domain vector update information includes a plurality of groups of space domain vector coefficients, and each group of space domain vector coefficients is used to perform weighted combination on the first group of space domain vectors, to obtain one space domain vector in the second group of space domain vectors.

The frequency domain vector update information is used to update a first group of frequency domain vectors to obtain a second group of frequency domain vectors. The frequency domain vector update information includes a plurality of groups of frequency domain vector coefficients, and each group of frequency domain vector coefficients is used to perform weighted combination on the first group of frequency domain vectors, to obtain one frequency domain vector in the second group of frequency domain vectors.

When being sent to the terminal device through a radio channel, a reference signal passes through a downlink channel. Therefore, the terminal device may detect information about the downlink channel for which there is no complete reciprocity. The terminal device may determine, based on the received reference signal, a weighting coefficient of each space-frequency vector that can be used to construct a precoding matrix adapted to the downlink channel. Specifically, for a method for determining, by the terminal device based on the received precoded reference signal, the weighting coefficient corresponding to each space-frequency vector, refer to the conventional technology. For brevity, details are not described in this embodiment of this application.

For ease of understanding, J space-frequency vectors used by the network device to precode the reference signal are denoted as a first group of space-frequency vectors, and weighting coefficients that are generated by the terminal device and that correspond to the first group of space-frequency vectors are denoted as space-frequency coefficients. As described above, it is assumed that J=B×T. Therefore, a dimension of a coefficient matrix $C_{DL}$ that includes space-frequency coefficients determined by the terminal device based on received precoded reference signals of the J ports may be B×T.

Optionally, before S420, the method 400 may further include: The terminal device receives first indication information. Correspondingly, the network device sends the first indication information to the terminal device.

The first indication information indicates a location of each space-frequency vector in the first group of space-frequency vectors in space-frequency space.

For example, the network device may add the first indication information to physical layer signaling, for example, DCI. Alternatively, the network device may add the first indication information to higher layer signaling, for example, a MAC CE or an RRC message. This is not limited in this application.

For example, if the network device obtains the precoded reference signal by precoding the reference signal based on B×T space-frequency vectors obtained by combining each of B space domain vectors and each of T frequency domain vectors, the first indication information indicates a location of each of the B×T space-frequency vectors in the space-frequency space.

As shown in FIG. 4, after receiving the reference signal from the network device, the terminal device cannot determine specific locations of the B×T space-frequency vectors used to precode the reference signal. To enable the terminal device to determine a specific location, in the coefficient matrix, of a space-frequency coefficient corresponding to each of the B×T space-frequency vectors, the network device may send the first indication information to the terminal device.

Further, the terminal device may generate space-frequency coefficient information based on at least one group of space-frequency coefficients. In this embodiment of this application, a matrix including the space-frequency coefficient information is denoted as C.

In an example, if the terminal device generates the space-frequency coefficient information based on one group of space-frequency coefficients, the space-frequency coefficient information is equivalent to the space-frequency coefficients.

It is assumed that a period in which the terminal device feeds back the space-frequency coefficient is 1 second. In this case, the terminal device generates a group of space-frequency coefficients based on a group of received reference signals in each second, and generates the space-frequency coefficient information based on the group of space-frequency coefficients. Further, the terminal device generates the space domain vector update information and the frequency domain vector update information based on the space-frequency coefficient information, and sends the space domain vector update information and the frequency domain vector update information to the network device. It may be understood that in this case, the terminal device feeds back all of the space-frequency coefficient, the space domain vector update information, and the frequency domain vector update information, in other words, frequency of feeding back the space-frequency coefficient by the terminal device is equal to frequency of feeding back the space domain vector update information and the frequency domain vector update information.

In another example, if the terminal device generates the space-frequency coefficient information based on a plurality of groups of space-frequency coefficients, the space-frequency coefficient information may be generated by statistically averaging the plurality of groups of space-frequency coefficients.

It is assumed that a period in which the terminal device feeds back the space-frequency coefficient is 1 second. In this case, the terminal device may generate the space domain vector update information and the frequency domain vector update information every 2 seconds based on two groups of generated space-frequency coefficients, the terminal device may generate the space domain vector update information and the frequency domain vector update information every 3 seconds based on three groups of generated space-frequency coefficients, or the terminal device may generate the space domain vector update information and the frequency domain vector update information at a longer interval. This is not limited in this embodiment of this application.

It is assumed that the terminal device generates the space-frequency coefficient information every 2 seconds. In this case, the terminal device does not generate the space domain vector update information and the frequency domain vector update information in a first second, and therefore feeds back only the space-frequency coefficient. In a second second, the terminal device generates the space-frequency coefficient information based on two groups of space-frequency coefficients, and generates the space domain vector update information and the frequency domain vector update information based on the space-frequency coefficient information, and therefore the terminal device feeds back the space-frequency coefficient, the space domain vector update information, and the frequency domain vector update information in the second second. It may be understood that in this case, frequency of feeding back the space-frequency coefficient by the terminal device is greater than frequency of feeding back the space domain vector update information and the frequency domain vector update information.

Two methods for feeding back the space domain vector update information and the frequency domain vector update information by the terminal device are listed above. It may be understood that regardless of a manner in which the terminal device feeds back the space domain vector update information and the frequency domain vector update information, there is a same method for generating, by the terminal device, the space domain vector update information and the frequency domain vector update information based on the space-frequency coefficient information. An example in which the frequency of feeding back the space-frequency coefficient by the terminal device is greater than the frequency of feeding back the space domain vector update information and the frequency domain vector update information is used below for description.

It is assumed that the period in which the terminal device feeds back the space-frequency coefficient is 1 second, and a period in which the space domain vector update information and the frequency domain vector update information are fed back is 3 seconds.

In a first second, the terminal device generates a first group of space-frequency coefficients, which is denoted as $C_{DL}^1$, based on received reference signals of the J ports, and then feeds back $C_{DL}^1$ to the network device.

In a second second, the terminal device generates a second group of space-frequency coefficients, which is denoted as $C_{DL}^2$, based on received reference signals of the J ports, and then feeds back $C_{DL}^2$ to the network device.

In a third second, the terminal device generates a third group of space-frequency coefficients, which is denoted as $C_{DL}^3$, based on received reference signals of the J ports, and then the terminal device generates the space-frequency coefficient information, which is denoted as C, based on the three groups of space-frequency coefficients. For example, $$C = \frac{C_{DL}^1 + C_{DL}^2 + C_{DL}^3}{3}.$$

Further, the terminal device generates the space domain vector update information and the frequency domain vector update information based on the space-frequency coefficient information.

It should be understood that before generating the space domain vector update information and the frequency domain vector update information, the terminal device may first determine a group quantity of the space domain vector coefficients and a group quantity of the frequency domain vector coefficients based on characteristic space of a statistical covariance matrix of the downlink channel.

To avoid a case in which the group quantity of the space domain vector coefficients and the group quantity of the frequency domain vector coefficients that are determined by the terminal device change within a large range, before S420, the method further includes: The terminal device receives second indication information. The second indication information indicates the group quantity of the space domain vector coefficients and the group quantity of the frequency domain vector coefficients. Correspondingly, the network device sends the second indication information.

For example, the network device may add the second indication information to physical layer signaling, for example, DCI. Alternatively, the network device may add the second indication information to higher layer signaling, for example, a MAC CE or an RRC message. This is not limited in this application.

When the terminal device determines the group quantity of the space domain vector coefficients and the group quantity of the frequency domain vector coefficients based on the second indication information, the terminal device may generate the space domain vector coefficients and the frequency domain vector coefficients based on the space-frequency coefficient information.

If J=B×T, a dimension of each of $C_{DL}^1$, $C_{DL}^2$, and $C_{DL}^3$ may be B×T, and further, a dimension of C may also be B×T. It is assumed that the group quantity of the space domain vector coefficients and the group quantity of the frequency domain vector coefficients that are indicated in the second indication information are respectively K and D. Each group of space domain vector coefficients is used to perform weighted combination on the first group of space domain vectors, to obtain one space domain vector in the second group of space domain vectors. Therefore, when the first group of space domain vectors includes the B space domain vectors, a quantity of space domain vector coefficients in each group of space domain vector coefficients is B. In other words, a dimension of a coefficient matrix $C_1$ that includes the K groups of space domain vector coefficients may be B×K. Similarly, each group of frequency domain vector coefficients is used to perform weighted combination on the first group of frequency domain vectors, to obtain one frequency domain vector in the second group of frequency domain vectors. Therefore, when the first group of frequency domain vectors includes the T frequency domain vectors, a quantity of frequency domain vector coefficients in each group of frequency domain vector coefficients is T. In other words, a dimension of a coefficient matrix $C_3$ that includes the D groups of frequency domain vector coefficients may be D×T.

A relationship between the space-frequency coefficient information C, the space domain vector update information $C_1$, and the frequency domain vector update information $C_3$ meets the following condition: $C=C_1C_2C_3$.

A relationship between a matrix S' that includes the first group of space domain vectors, a matrix S that includes the second group of space domain vectors, and the space domain vector update information $C_1$ meets the following condition: $S=S'C_1$.

A relationship between a matrix F' that includes the first group of frequency domain vectors, a matrix F that includes the second group of frequency domain vectors, and the frequency domain vector update information $C_3$ meets the following condition: $F^H=C_3F'^H$.

As described above, a space-frequency matrix $H_{DL}$ meets the following condition: $H_{DL}=S'C_{DL}F'^H$. With reference to $C=C_1C_2C_3$, $S=S'C_1$, and $F^H=C_3F'^H$, $H_{DL}=SC_2F^H$ may be obtained. Further, after the foregoing formulas are transformed, $C_2=S^HH_{DL}F$ may be obtained. Therefore, the coefficient matrix $C_2$ may represent a projection coefficient of $H_{DL}$ on S and F, in other words, the coefficient matrix $C_2$ may represent a projection coefficient of a downlink instantaneous channel on S and F. That is, each element in $C_2$ represents a weighting coefficient corresponding to a space-frequency vector that includes one space domain vector in the second group of space domain vectors and one frequency domain vector in the second group of frequency domain vectors.

Further, the terminal device feeds back the space domain vector update information $C_1$, the frequency domain vector update information $C_3$, and the space-frequency coefficient $C_2$ to the network device. That is, the space-frequency coefficients fed back by the terminal device to the network device in the third second are not $C_{DL}^3$ generated based on a received third reference signal in the third second, but are the space-frequency coefficient $C_2$ generated based on the space-frequency coefficient information.

It may be understood that the space-frequency coefficients fed back by the terminal device in the first second and the second second may be used to perform weighted combination on the first group of space-frequency vectors, to obtain a precoding vector. The space-frequency coefficients fed back by the terminal device in the third second may be used to perform weighted combination on a plurality of space-frequency vectors including the second group of space domain vectors and the second group of frequency domain vectors, to obtain a precoding vector.

It may be understood that the reference signals sent by the network device to the terminal device in the first second to the third second are reference signals obtained by performing precoding based on the first group of space domain vectors and the first group of frequency domain vectors.

After the network device receives the space domain vector update information and the frequency domain vector update information fed back by the terminal device in the third second, the network device may update the first group of space domain vectors based on the space domain vector update information, and update the first group of frequency domain vectors based on the frequency domain vector update information.

For example, the network device may obtain a $k^{th}$ space domain vector $m(\theta_k)=(\theta_0)c_{1,k,0}+a(\theta_1)c_{1,k,1}+ \ldots + a(\theta_{B-1})c_{1,k,B-1}$ in the second group of space domain vectors based on the first group of space domain vectors $S'=[a(\theta_0) \ a(\theta_1) \ldots a(\theta_{B-1})]$ and a $k^{th}$ group of space domain vector coefficients $c_{1,k}=[c_{1,k,0} \ c_{1,k,1} \ldots c_{1,k,B-1}]^H$ in the space domain vector update information $C_1$, where $0 \leq k \leq K$.

The network device may obtain a $d^{th}$ frequency domain vector $l(\tau_d)=C_{3,d,0}b(\tau_0)+c_{3,d,1}b(\tau_1)+ \ldots +c_{3,d,T-1}b(T-1)$ in the second group of frequency domain vectors based on the first group of frequency domain vectors $F'^H=[b(\theta_0) \ b(\tau_1) \ldots b(\tau_{T-1})]^H$ and a $d^{th}$ group of frequency domain vector coefficients $c_{3,c}=[c_{3,d,0} \ c_{3,d,1} \ldots c_{3,d,T-1}]$ in the frequency domain vector update information $C_3$, where $0 \leq d \leq D$.

After calculating the second group of space domain vectors and the second group of frequency domain vectors, the network device sends, to the terminal device in a fourth second, a reference signal obtained by performing precoding based on the second group of space domain vectors and the second group of frequency domain vectors. If J=K×D, a dimension of a space-frequency coefficient matrix $C_{DL}^4$ generated by the terminal device based on the received reference signal in the fourth second may be K×D. In this case, when K is less than B and/or D is less than T, the dimension of the space-frequency coefficient fed back by the terminal device in the fourth second is less than the dimensions of the space-frequency coefficients fed back in the first second and the second second. In other words, when the downlink channel is measured based on the updated space domain vector and frequency domain vector, feedback overheads of the terminal device may be reduced. As described above, $S=S'C_1$. After the formula is transformed, $C_1=S'^H S$ may be obtained. Therefore, the space domain vector update information $C_1$ may represent a projection coefficient of S on S'. In other words, the space domain vector update information $C_1$ may represent a projection coefficient of the characteristic space of the statistical covariance matrix of the downlink channel on S'.

As described above, $F^H=C_3 F'^H$. After the formula is transformed, $C_3=F^H F'$ may be obtained. Therefore, the frequency domain vector update information $C_3$ may represent a projection coefficient of F on F'. In other words, the frequency domain vector update information $C_3$ may represent a projection coefficient of the characteristic space of the statistical covariance matrix of the downlink channel on F'.

Optionally, after receiving the space-frequency coefficient fed back by the terminal device, the network device may determine a precoding vector based on the space-frequency coefficient. Specifically, for a method for determining the precoding vector by the network device, refer to the conventional technology. For brevity, details are not described in this embodiment of this application.

It should be noted that a process of generating the space domain vector update information and the frequency domain vector update information by the terminal device is described above by using one polarization direction and one receive antenna as an example. In other words, the K groups of space domain vector coefficients and the D groups of frequency domain vector coefficients may be determined based on a precoded reference signal that is sent by a transmit antenna in one polarization direction and that is received by one receive antenna. However, this should not constitute any limitation on this application.

When a plurality of receive antennas are configured for the terminal device, the one receive antenna described in the foregoing example may be any one of the plurality of receive antennas configured for the terminal device. In other words, the terminal device may determine K groups of space domain vector coefficients and D groups of frequency domain vector coefficients for each receive antenna based on the foregoing method.

When a transmit antenna in a plurality of polarization directions is configured for the network device, the one polarization direction described in the foregoing example may be any one of the plurality of polarization directions. In other words, the terminal device may determine K groups of space domain vector coefficients and D groups of frequency domain vector coefficients based on the foregoing method and a precoded reference signal sent by the transmit antenna in each polarization direction.

Optionally, the space domain vector update information and the frequency domain vector update information respectively include R groups of space domain vector update information fed back based on the receive antenna and R groups of frequency domain vector update information fed back based on the receive antenna. Each group of space domain vector update information fed back based on the receive antenna and each group of frequency domain vector update information fed back based on the receive antenna correspond to one receive antenna. Each group of space domain vector update information fed back based on the receive antenna includes K groups of space domain vector coefficients corresponding to the one receive antenna, and each group of frequency domain vector update information fed back based on the receive antenna includes D groups of frequency domain vector coefficients corresponding to the one receive antenna.

It should be understood that it is merely a possible implementation in which the terminal device feeds back the space domain vector update information and the frequency domain vector update information based on a receive port. This should constitute no limitation on this application.

In another implementation, the terminal device may feed back the space domain vector update information and the frequency domain vector update information based on a transport layer. In this implementation, in each of the K groups of space domain vector coefficients included in the space domain vector update information, space domain vector coefficients corresponding to each space domain vector may include Z space domain vector coefficients corresponding to Z transport layers, and in each of the D groups of frequency domain vector coefficients included in the frequency domain vector update information, frequency domain vector coefficients corresponding to each frequency domain vector may include Z frequency domain vector coefficients corresponding to the Z transport layers.

For ease of understanding, a process in which the terminal device determines the frequency domain vector update information fed back based on the transport layer is described herein by using frequency domain vector update information in two polarization directions as an example.

It is assumed that R frequency domain vector coefficients correspond to each frequency domain vector in each group of frequency domain vector coefficients determined by the terminal device, and correspond to R receive ports. In this case, the frequency domain vector update information $C_3$ determined by the terminal device based on the receive port may be represented as follows:

$$\begin{bmatrix} c_{3,0,0} & c_{3,0,1} & \cdots & c_{3,0,R-1} \\ c_{3,1,0} & c_{3,1,1} & \cdots & c_{3,1,R-1} \\ \vdots & \vdots & \ddots & \vdots \\ c_{3,D-1,0} & c_{3,D-1,1} & \cdots & c_{3,D-1,R-1} \\ c_{3,D,0} & c_{3,D,1} & \cdots & c_{3,D,R-1} \\ c_{3,D+1,0} & c_{3,D+1,1} & \cdots & c_{3,D+1,R-1} \\ \vdots & \vdots & \ddots & \vdots \\ c_{3,2D-1,0} & c_{3,2D-1,1} & \cdots & c_{3,2D-1,R-1} \end{bmatrix}$$

Coefficient vectors in the first D rows in the matrix correspond to D groups of frequency domain vector coefficients corresponding to the T frequency domain vectors in a first polarization direction, and coefficient vectors in the last D rows correspond to D groups of frequency domain vector coefficients corresponding to the T frequency domain vectors in a second polarization direction. Coefficient vectors in a $d^{th}$ row and an $r^{th}$ column in the first D rows represent a $d^{th}$ group of frequency domain vector coefficients corresponding to an $r^{th}$ receive port in the first polarization direction, and coefficient vectors in a $d^{th}$ row and an $r^{th}$ column in the last D rows represent a $d^{th}$ group of frequency domain vector coefficients corresponding to the $r^{th}$ receive port in the second polarization direction.

For example, the terminal device may perform SVD on the coefficient matrix $C_3$, to obtain frequency domain vector coefficients fed back based on the transport layer. The frequency domain vector coefficients determined by the terminal device based on the transport layer may be represented by using a matrix, and may be as follows:

$$\begin{bmatrix} p_{3,0,0} & p_{3,0,1} & \cdots & p_{3,0,Z-1} \\ p_{3,1,0} & p_{3,1,1} & \cdots & p_{3,1,Z-1} \\ \vdots & \vdots & \ddots & \vdots \\ p_{3,D-1,0} & p_{3,D-1,1} & \cdots & p_{3,D-1,Z-1} \\ p_{3,D,0} & p_{3,D,1} & \cdots & p_{3,D,Z-1} \\ p_{3,D+1,0} & p_{3,D+1,1} & \cdots & p_{3,D+1,Z-1} \\ \vdots & \vdots & \ddots & \vdots \\ p_{3,2D-1,0} & p_{3,2D-1,1} & \cdots & p_{3,2D-1,Z-1} \end{bmatrix}$$

Each group of frequency domain vector coefficients in the coefficient matrix is represented by p, to be distinguished from the frequency domain vector coefficients c fed back based on the receive port. The first D rows in the coefficient matrix may correspond to the first polarization direction, and the last D rows may correspond to the second polarization direction. Z columns correspond to the Z transport layers. Coefficient vectors in a $d^{th}$ row and a $z^{th}$ column in the first D rows represent a $d^{th}$ group of frequency domain vector coefficients corresponding to a $z^{th}$ transport layer in the first polarization direction, and coefficient vectors in a $d^{th}$ row and a $z^{th}$ column in the last D rows represent a $d^{th}$ group of frequency domain vector coefficients corresponding to the $z^{th}$ transport layer in the second polarization direction.

It may be learned that the terminal device may determine, based on the frequency domain vector coefficients that correspond to the T frequency domain vectors and that are determined based on the receive port, the frequency domain vector coefficients that correspond to the T frequency domain vectors and that are fed back based on the transport layer.

The terminal device may generate the frequency domain vector update information based on frequency domain vector coefficients of the T frequency domain vectors corresponding to each transport layer in each polarization direction.

It should be understood that the process in which the terminal device determines the frequency domain vector update information fed back based on the transport layer is merely an example, and should not constitute any limitation on this application. A specific method for determining, by the terminal device, the frequency domain vector update information fed back based on the transport layer is not limited in this application.

In this embodiment of this application, the terminal device generates, based on statistics about space domain characteristics of the downlink channel, the space domain vector update information corresponding to the first group of space domain vectors, generates, based on statistics about frequency domain characteristics of the downlink channel, the frequency domain vector update information corresponding to the first group of frequency domain vectors, and sends the space domain vector update information and the frequency domain vector update information to network device. Further, the network device corrects, based on the space domain vector update information, the first group of space domain vectors obtained based on reciprocity between an uplink channel and the downlink channel, to obtain the second group of space domain vectors, and may correct, based on the frequency domain vector update information, the first group of frequency domain vectors obtained based on the reciprocity between the uplink channel and the downlink channel, to obtain the second group of frequency domain vectors, so as to resolve a problem that sparsity of the space domain information and frequency domain information of the uplink channel and the downlink channel is not high enough. Further, the network device performs downlink channel measurement based on the corrected second group of space domain vectors and second group of frequency domain vectors, to better match the determined precoding matrix with the downlink channel.

In addition, when a quantity of space domain vectors included in the second group of space domain vectors obtained by the network device based on the space domain vector update information is less than a quantity of space domain vectors included in the first group of space domain vectors, the network device precodes the reference signal based on the second group of space domain vectors, to reduce pilot overheads. Alternatively, when a quantity of frequency domain vectors included in the second group of frequency domain vectors obtained by the network device based on the frequency domain vector update information is less than a quantity of frequency domain vectors included in the first group of frequency domain vectors, the network device precodes the reference signal based on the second group of frequency domain vectors, to reduce pilot overheads.

Figure 6:
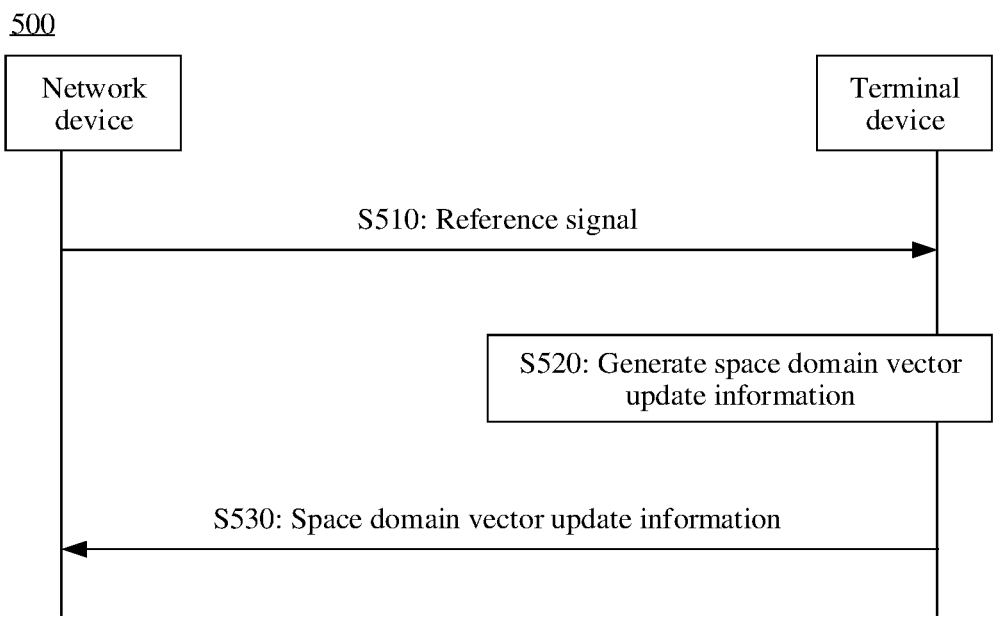
FIG. 6 is a schematic flowchart of an update method according to still another embodiment of this application.

FIG. 6 is a schematic flowchart of an update method according to an embodiment of this application. FIG. 6 is a schematic flowchart of an update method 500 according to an embodiment of this application from a perspective of device interaction. The method 500 shown in FIG. 6 may include S510 to S530. The operations in the method 500 are described below in detail.

S510. A terminal device receives a reference signal. Correspondingly, in S510, a network device sends the reference signal.

The reference signal sent by the network device is a reference signal on which no precoding is performed.

S520. The terminal device generates space domain vector update information.

S530. The terminal device sends the space domain vector update information. Correspondingly, in S530, the network device receives the space domain vector update information.

The space domain vector update information is used to update a first group of space domain vectors to obtain a second group of space domain vectors. The space domain vector update information includes a plurality of groups of space domain vector coefficients, and each group of space domain vector coefficients is used to perform weighted combination on the first group of space domain vectors, to obtain one space domain vector in the second group of space domain vectors.

For a method for generating the space domain vector update information by the terminal device, refer to the description in S320. A difference from S320 lies in that in S520, the terminal device first generates the first group of space domain vectors and a first group of frequency domain vectors based on the received reference signal; and then generates a weighting coefficient of each space-frequency vector that can be used to construct a precoding matrix adapted to a downlink channel, in other words, generates a group of space-frequency coefficients corresponding to a first group of space-frequency vectors that includes a space domain vector in the first group of space domain vectors and a frequency domain vector in the first group of frequency domain vectors; and then the terminal device generates space-frequency coefficient information based on at least one group of space-frequency coefficients; and then generates the space domain vector update information based on the space-frequency coefficient information, and sends the space domain vector update information to the network device.

It should be understood that to avoid a case in which a quantity of space domain vectors included in the first group of space domain vectors and a quantity of frequency domain vectors included in the first group of frequency domain vectors that are generated by the terminal device change within a large range, the network device may send, to the terminal device, indication information used to indicate the quantity of generated space domain vectors and the quantity of generated frequency domain vectors. In this embodiment of this application, if a quantity of space domain vectors in the second group of space domain vectors obtained by the network device based on the space domain vector update information is less than the quantity of space domain vectors in the first group of space domain vectors, in subsequent channel measurement, the quantity of space domain vectors indicated in the indication information that is sent by the network device to the terminal device and that indicates the quantity of space domain vectors may be reduced. Further, the terminal device may generate a smaller quantity of space domain vectors based on the received indication information, to reduce feedback overheads of the terminal device.

Figure 7:
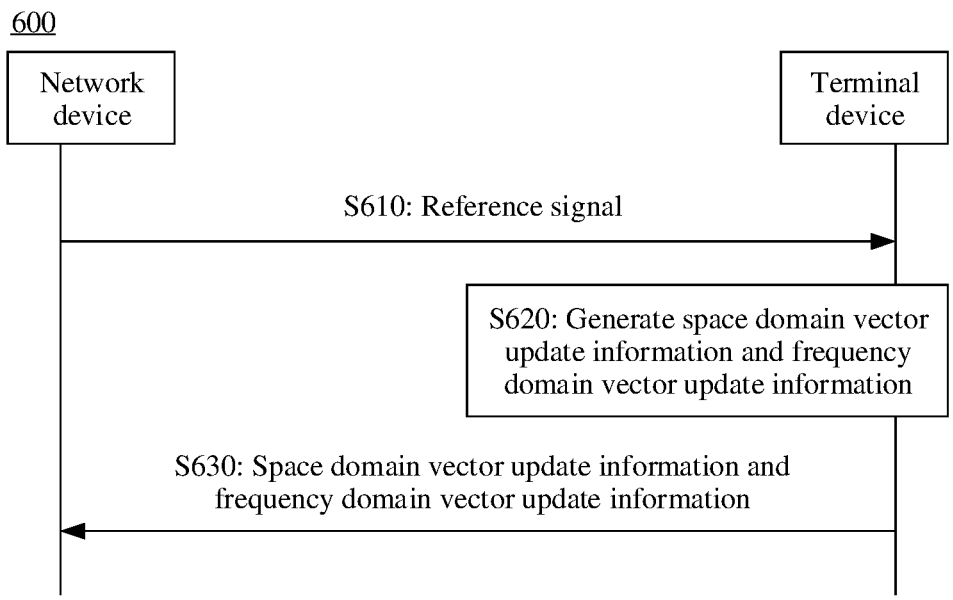
FIG. 7 is a schematic flowchart of an update method according to yet another embodiment of this application.

FIG. 7 is a schematic flowchart of an update method according to another embodiment of this application. The method 600 shown in FIG. 7 may include S610 to S630. The operations in the method 600 are described below in detail.

S610. A terminal device receives a reference signal. Correspondingly, in S610, a network device sends the reference signal.

The reference signal sent by the network device is a reference signal on which no precoding is performed.

S620. The terminal device generates space domain vector update information and frequency domain vector update information.

S630. The terminal device sends the space domain vector update information and the frequency domain vector update information. Correspondingly, in S630, the network device receives the space domain vector update information and the frequency domain vector update information.

The space domain vector update information is used to update a first group of space domain vectors to obtain a second group of space domain vectors. The space domain vector update information includes a plurality of groups of space domain vector coefficients, and each group of space domain vector coefficients is used to perform weighted combination on the first group of space domain vectors, to obtain one space domain vector in the second group of space domain vectors.

The frequency domain vector update information is used to update a first group of frequency domain vectors to obtain a second group of frequency domain vectors. The frequency domain vector update information includes a plurality of groups of frequency domain vector coefficients, and each group of frequency domain vector coefficients is used to perform weighted combination on the first group of frequency domain vectors, to obtain one frequency domain vector in the second group of frequency domain vectors.

For a method for generating the space domain vector update information and the frequency domain vector update information by the terminal device, refer to the description in S420. A difference from S420 lies in that in S620, the terminal device first generates the first group of space domain vectors and the first group of frequency domain vectors based on the received reference signal; and then generates a weighting coefficient of each space-frequency vector that can be used to construct a precoding matrix adapted to a downlink channel, in other words, generates a group of space-frequency coefficients corresponding to a first group of space-frequency vectors that includes a space domain vector in the first group of space domain vectors and a frequency domain vector in the first group of frequency domain vectors; and then the terminal device generates space-frequency coefficient information based on at least one group of space-frequency coefficients; and then generates the space domain vector update information and the frequency domain vector update information based on the space-frequency coefficient information, and sends the space domain vector update information and the frequency domain vector update information to the network device.

It should be understood that to avoid a case in which a quantity of space domain vectors included in the first group of space domain vectors and a quantity of frequency domain vectors included in the first group of frequency domain vectors that are generated by the terminal device change within a large range, the network device may send, to the terminal device, indication information used to indicate the quantity of generated space domain vectors and the quantity of generated frequency domain vectors. In this embodiment of this application, if a quantity of space domain vectors in the second group of space domain vectors obtained by the network device based on the space domain vector update information is less than the quantity of space domain vectors in the first group of space domain vectors, in subsequent channel measurement, the quantity of space domain vectors indicated in the indication information that is sent by the network device to the terminal device and that indicates the quantity of space domain vectors may be reduced. Further, the terminal device may generate a smaller quantity of space domain vectors based on the received indication information, to reduce feedback overheads of the terminal device. Similarly, if a quantity of frequency domain vectors in the second group of frequency domain vectors obtained by the network device based on the frequency domain vector update information is less than a quantity of frequency domain vectors in the first group of frequency domain vectors, feedback overheads of the terminal device in subsequent channel measurement may be reduced.

Figure 8:
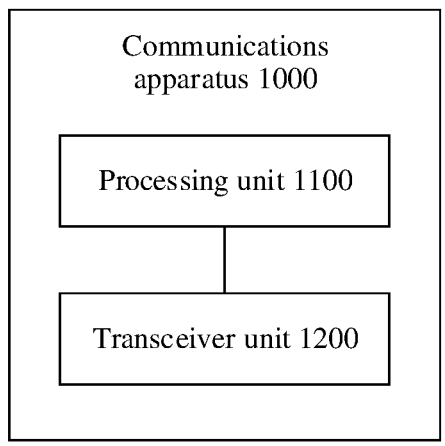
FIG. 8 is a schematic block diagram of a communications apparatus according to an embodiment of this application.

FIG. 8 is a schematic block diagram of a communications apparatus according to an embodiment of this application. As shown in FIG. 8, the communications apparatus 1000 may include a processing unit 1100 and a transceiver unit 1200.

In a possible design, the communications apparatus 1000 may correspond to the terminal device in the foregoing method embodiments, for example, may be a terminal device or a component (for example, a chip or a chip system) configured in the terminal device.

It should be understood that the communications apparatus 1000 may correspond to the terminal device in the method 300 to the method 600 according to embodiments of this application. The communications apparatus 1000 may include units configured to perform methods performed by the terminal device in the method 300 in FIG. 3, the method 400 in FIG. 5, the method 500 in FIG. 6, and the method 600 in FIG. 7. In addition, the units in the communications apparatus 1000 and the foregoing other operations and/or functions are separately used to implement a corresponding procedure of any one of the method 300 in FIG. 3, the method 400 in FIG. 5, the method 500 in FIG. 6, and the method 600 in FIG. 7.

When the communications apparatus 1000 is configured to perform the method 300 in FIG. 3, the processing unit 1100 may be configured to perform S320 in the method 300, and the transceiver unit 1200 may be configured to perform S310 and S330 in the method 300. It should be understood that a specific process in which the units perform the foregoing corresponding operations has been described in detail in the foregoing method embodiments. For brevity, details are not described herein again.

When the communications apparatus 1000 is configured to perform the method 400 in FIG. 5, the processing unit 1100 may be configured to perform S420 in the method 400, and the transceiver unit 1200 may be configured to perform S410 and S430 in the method 400. It should be understood that a specific process in which the units perform the foregoing corresponding operations has been described in detail in the foregoing method embodiments. For brevity, details are not described herein again.

When the communications apparatus 1000 is configured to perform the method 500 in FIG. 6, the processing unit 1100 may be configured to perform S520 in the method 500, and the transceiver unit 1200 may be configured to perform S510 and S530 in the method 500. It should be understood that a specific process in which the units perform the foregoing corresponding operations has been described in detail in the foregoing method embodiments. For brevity, details are not described herein again.

When the communications apparatus 1000 is configured to perform the method 600 in FIG. 7, the processing unit 1100 may be configured to perform S620 in the method 600, and the transceiver unit 1200 may be configured to perform S610 and S630 in the method 600. It should be understood that a specific process in which the units perform the foregoing corresponding operations has been described in detail in the foregoing method embodiments. For brevity, details are not described herein again.

Figure 9:
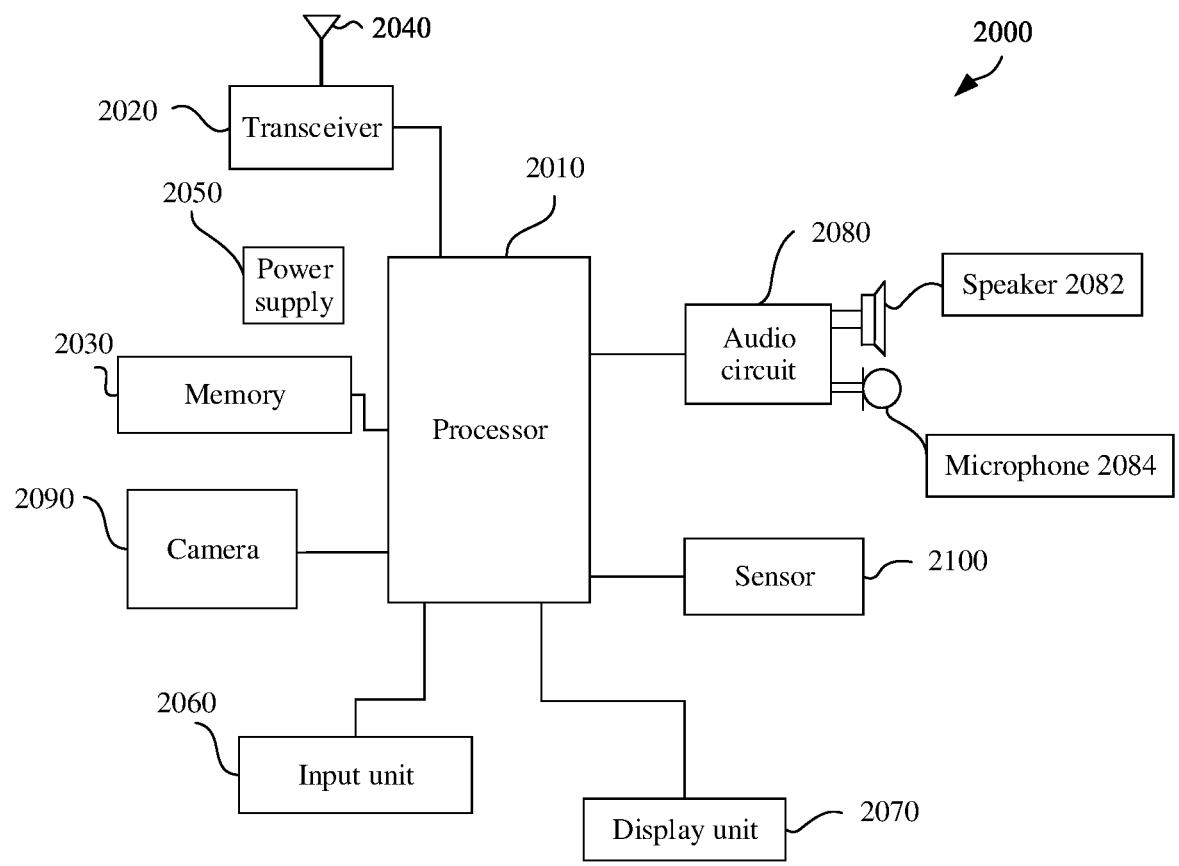
FIG. 9 is a schematic diagram of a structure of a terminal device according to an embodiment of this application.

It should be further understood that when the communications apparatus 1000 is a terminal device, the transceiver unit 1200 in the communications apparatus 1000 may be implemented by using a transceiver, for example, may correspond to a transceiver 2020 in a terminal device 2000 shown in FIG. 9, and the processing unit 1100 in the communications apparatus 1000 may be implemented by using at least one processor, for example, may correspond to a processor 2010 in the terminal device 2000 shown in FIG. 9.

It should be further understood that when the communications apparatus 1000 is a chip configured in a terminal device, the transceiver unit 1200 in the communications apparatus 1000 may be implemented by using an input/output interface, and the processing unit 1100 in the communications apparatus 1000 may be implemented by using a processor, a microprocessor, an integrated circuit, or the like integrated into the chip or a chip system.

In another possible design, the communications apparatus 1000 may correspond to the network device in the foregoing method embodiments, for example, may be a network device or a component (for example, a chip or a chip system) configured in a network device.

It should be understood that the communications apparatus 1000 may correspond to the network device in the method 300 to the method 600 according to embodiments of this application. The communications apparatus 1000 may include units configured to perform methods performed by the network device in the method 300 in FIG. 3, the method 400 in FIG. 5, the method 500 in FIG. 6, and the method 600 in FIG. 7. In addition, the units in the communications apparatus 1000 and the foregoing other operations and/or functions are separately used to implement a corresponding procedure of any one of the method 300 in FIG. 3, the method 400 in FIG. 5, the method 500 in FIG. 6, and the method 600 in FIG. 7.

When the communications apparatus 1000 is configured to perform the method 300 in FIG. 3, the processing unit 1100 may be configured to perform S330 in the method 300, and the transceiver unit 1200 may be configured to perform S310 and S330 in the method 300. It should be understood that a specific process in which the units perform the foregoing corresponding operations has been described in detail in the foregoing method embodiments. For brevity, details are not described herein again.

When the communications apparatus 1000 is configured to perform the method 400 in FIG. 5, the processing unit 1100 may be configured to perform S430 in the method 400, and the transceiver unit 1200 may be configured to perform S410 and S430 in the method 400. It should be understood that a specific process in which the units perform the foregoing corresponding operations has been described in detail in the foregoing method embodiments. For brevity, details are not described herein again.

When the communications apparatus 1000 is configured to perform the method 500 in FIG. 6, the processing unit 1100 may be configured to perform S530 in the method 500, and the transceiver unit 1200 may be configured to perform S510 and S530 in the method 500. It should be understood that a specific process in which the units perform the foregoing corresponding operations has been described in detail in the foregoing method embodiments. For brevity, details are not described herein again.

When the communications apparatus 1000 is configured to perform the method 600 in FIG. 7, the processing unit 1100 may be configured to perform S630 in the method 600, and the transceiver unit 1200 may be configured to perform S610 and S630 in the method 600. It should be understood that a specific process in which the units perform the foregoing corresponding operations has been described in detail in the foregoing method embodiments. For brevity, details are not described herein again.

Figure 10:
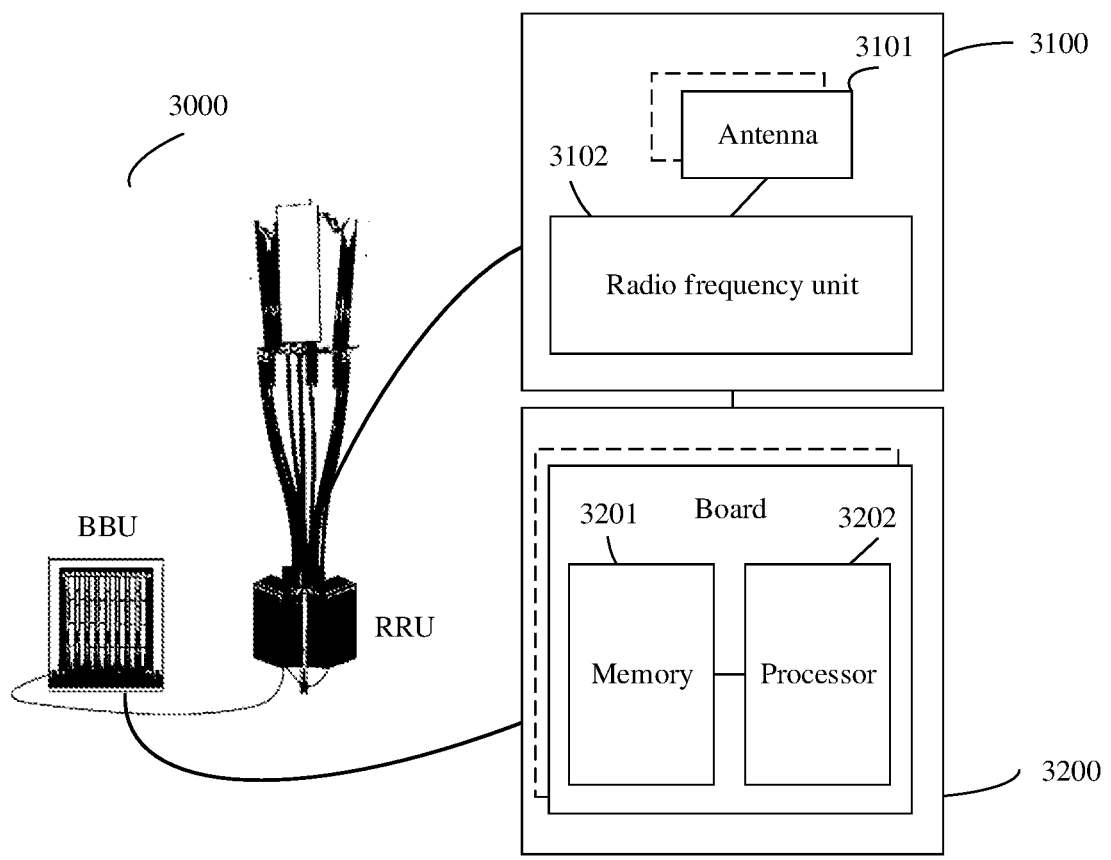
FIG. 10 is a schematic diagram of a structure of a network device according to an embodiment of this application.

It should be further understood that when the communications apparatus 1000 is a network device, the transceiver unit in the communications apparatus 1000 may be implemented by using a transceiver, for example, may correspond to a transceiver 3200 in a network device 3000 shown in FIG. 10, and the processing unit 1100 in the communications apparatus 1000 may be implemented by using at least one processor, for example, may correspond to a processor 3100 in the network device 3000 shown in FIG. 10.

It should be further understood that when the communications apparatus 1000 is a chip configured in a network device, the transceiver unit 1200 in the communications apparatus 1000 may be implemented by using an input/output interface, and the processing unit 1100 in the communications apparatus 1000 may be implemented by using a processor, a microprocessor, an integrated circuit, or the like integrated into the chip or a chip system.

FIG. 9 is a schematic diagram of a structure of a terminal device 2000 according to an embodiment of this application. The terminal device 2000 may be applied to the system shown in FIG. 1, and performs a function of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection channel, to transfer a control signal and/or a data signal. The memory 2030 is configured to store a computer program. The processor 2010 is configured to: invoke the computer program from the memory 2030, and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be combined into one processing apparatus, and the processor 2010 is configured to execute program code stored in the memory 2030 to implement the foregoing function. In specific implementation, the memory 2030 may be integrated into the processor 2010, or may be independent of the processor 2010. The processor 2010 may correspond to the processing unit in FIG. 8.

The transceiver 2020 may correspond to the transceiver unit in FIG. 8, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal. The transmitter is configured to transmit a signal.

It should be understood that the terminal device 2000 shown in FIG. 9 can implement the processes performed by the terminal device in the method embodiments in FIG. 3 and FIG. 5 to FIG. 7. Operations and/or functions performed by the modules in the terminal device 2000 are separately used to implement the corresponding procedure in the foregoing method embodiments. For details, refer to the descriptions in the foregoing method embodiments. To avoid repetition, detailed descriptions are appropriately omitted herein.

The processor 2010 may be configured to perform an action that is implemented inside the terminal device and that is described in the foregoing method embodiments. The transceiver 2020 may be configured to perform a sending action by the terminal device for the network device or a receiving operation from the network device in the foregoing method embodiments. For details, refer to the descriptions in the foregoing method embodiments. Details are not described herein again.

Optionally, the terminal device 2000 may further include a power supply 2050, configured to supply power to components or circuits in the terminal device.

In addition, to improve functions of the terminal device, the terminal device 2000 may further include one or more of an input unit 2060, a display unit 2070, an audio circuit 2080, a camera 2090, a sensor 2100, or the like. The audio circuit may further include a speaker 2082, a microphone 2084, and the like.

FIG. 10 is a schematic diagram of a structure of a network device according to an embodiment of this application, for example, may be a schematic diagram of a structure of a base station. The base station 3000 may be applied to the system shown in FIG. 1, and performs a function of the network device in the foregoing method embodiments. As shown in the figure, the base station 3000 may include one or more radio frequency units such as a remote radio unit (RRU) 3100 and one or more baseband units (BBU) (which may also be referred to as distributed units (DU)) 3200. The RRU 3100 may be referred to as a transceiver unit, and corresponds to the transceiver unit 1200 in FIG. 8. Optionally, the transceiver unit 3100 may also be referred to as a transceiver, a transceiver circuit, or the like, and the transceiver unit 3100 may include at least one antenna 3101 and a radio frequency unit 3102. Optionally, the transceiver unit 3100 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to: receive and send a radio frequency signal, and perform conversion between the radio frequency signal and a baseband signal, for example, configured to send indication information to a terminal device. The BBU 3200 is mainly configured to: perform baseband processing, control the base station, and the like. The RRU 3100 and the BBU 3200 may be physically disposed together, or may be physically separated, in other words, may be on a distributed base station.

The BBU 3200 is a control center of the base station, may also be referred to as a processing unit, may correspond to the processing unit 1100 in FIG. 8, and is mainly configured to implement a baseband processing function, for example, channel coding, multiplexing, modulation, and spreading. For example, the BBU (processing unit) may be configured to control the base station to perform the operation procedure related to the network device in the foregoing method embodiments, for example, generate the indication information.

In an example, the BBU 3200 may include one or more boards, and a plurality of boards may jointly support a radio access network (for example, an LTE network) of a single access standard, or may respectively support radio access networks (for example, an LTE network, a 5G network, or another network) of different access standards. The BBU 3200 further includes a memory 3201 and a processor 3202. The memory 3201 is configured to store necessary instructions and data. The processor 3202 is configured to control the base station to perform a necessary action, for example, configured to control the base station to perform the operation procedure related to the network device in the foregoing method embodiments. The memory 3201 and the processor 3202 may serve one or more boards. In other words, a memory and a processor may be deployed on each board. Alternatively, a plurality of boards may share a same memory and a same processor. In addition, a necessary circuit may be further disposed on each board.

It should be understood that the base station 3000 shown in FIG. 10 can implement the processes performed by the network device in the method embodiments in FIG. 3 and FIG. 5 to FIG. 7. Operations and/or functions performed by the modules in the base station 3000 are separately used to implement the corresponding procedure in the foregoing method embodiments. For details, refer to the descriptions in the foregoing method embodiments. To avoid repetition, detailed descriptions are appropriately omitted herein.

The BBU 3200 may be configured to perform the action that is implemented inside the network device and that is described in the foregoing method embodiments, and the RRU 3100 may be configured to perform the action of sending information by the network device to the terminal device or the action of receiving information by the network device from the terminal device and that is described in the foregoing method embodiments. For details, refer to the descriptions in the foregoing method embodiments. Details are not described herein again.

It should be understood that the base station 3000 shown in FIG. 10 is merely a possible form of the network device, and should not constitute any limitation on this application. The method provided in this application is applicable to a network device in another form. For example, the network device includes an AAU, and may further include a CU and/or a DU, or includes a BBU and an adaptive radio unit (ARU) or a BBU. Alternatively, the network device may be customer premises equipment (CPE), or may be in another form. A specific form of the network device is not limited in this application.

The CU and/or the DU may be configured to perform the action that is implemented inside the network device and that is described in the foregoing method embodiment, and the AAU may be configured to perform the action of sending information by the network device to the terminal device or the action of receiving information by the network device from the terminal device and that is described in the foregoing method embodiments. For details, refer to the descriptions in the foregoing method embodiments. Details are not described herein again.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (FPGA), an application-specific integrated circuit (ASIC), a system on chip (SoC), a central processor unit (CPU), a network processor (NP), a digital signal processing circuit (DSP), a micro controller unit (MCU), or a programmable controller (PLD) or another integrated chip.

In an implementation process, the operations in the foregoing methods can be implemented by using a hardware integrated logic circuit in the processor, or by using instructions in a form of software. The operations of the method disclosed with reference to embodiments of this application may be directly performed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that, the processor in this embodiment of this application may be an integrated circuit chip, and has a signal processing capability. In an implementation process, the operations in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, operations, and logical block diagrams that are disclosed in embodiments of this application. The general-purpose processor may be a microprocessor, or the processor may be any conventional processor or the like. The operations of the method disclosed with reference to embodiments of this application may be directly performed by a hardware decoding processor, or may be performed by a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in this embodiment of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these and any memory of another appropriate type.

According to the method provided in embodiments of this application, this application further provides a computer program product. The computer program product includes computer program code. When the computer program code is run on a computer, the computer is enabled to perform the methods respectively performed by the terminal device and the network device in the embodiments shown in FIG. 3 and FIG. 5 to FIG. 7.

According to the method provided in embodiments of this application, this application further provides a computer-readable medium. The computer-readable medium stores program code. When the program code is run on a computer, the computer is enabled to perform the methods respectively performed by the terminal device and the network device in the embodiments shown in FIG. 3 and FIG. 5 to FIG. 7.

According to the method provided in embodiments of this application, this application further provides a system. The system includes the foregoing one or more terminal devices and the foregoing one or more network devices.

The network device and the terminal device in the apparatus embodiments fully correspond to the network device or the terminal device in the method embodiments. A corresponding module or unit performs a corresponding operation. For example, the communications unit (transceiver) performs a receiving operation or a sending operation in the method embodiments, and an operation other than the sending operation and the receiving operation may be performed by the processing unit (processor). For a specific function of the unit, refer to the corresponding method embodiments. There may be one or more processors.

Terms such as "component", "module", and "system" used in this specification are used to indicate a computer-related entity, hardware, firmware, a combination of hardware and software, software, or software being executed. For example, a component may be, but is not limited to, a process that is run on a processor, a processor, an object, an executable file, an execution thread, a program, and/or a computer. As illustrated by using figures, both a computing device and an application that is run on the computing device may be components. One or more components may reside within a process and/or an execution thread, and a component may be located on one computer and/or distributed between two or more computers. In addition, these components may be executed by various computer-readable media that store various data structures. The components may communicate through a local and/or remote process and based on, for example, a signal having one or more data packets (for example, data from two components interacting with another component in a local system, in a distributed system, and/or across a network such as the Internet interacting with other systems by using the signal).

A person of ordinary skill in the art may be aware that, various illustrative logical blocks (illustrative logical blocks) and operations that are described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

In the foregoing embodiments, all or some of the functions of the functional units may be implemented by software, hardware, firmware, or any combination thereof. When software is used to implement embodiments, all or some of embodiments may be implemented in a form of a computer program product. The computer program product includes one or more computer instructions (programs). When the computer program instructions (programs) are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   generating space domain vector update information, wherein:
      the space domain vector update information is configured to be usable to update a first group of space domain vectors to obtain a second group of space domain vectors,
      the space domain vector update information is generated based on statistics about space domain characteristics of a downlink channel,
      the space domain vector update information comprises a plurality of groups of space domain vector coefficients, and
      each group of space domain vector coefficients of the plurality of groups of space domain vector coefficients is configured to be usable to perform weighted combination on the first group of space domain vectors, to obtain one respective space domain vector in the second group of space domain vectors; and
   sending the space domain vector update information.

2. The method according to claim 1, further comprising:
   generating frequency domain vector update information, wherein the frequency domain vector update information is configured to be usable to update a first group of frequency domain vectors to obtain a second group of frequency domain vectors, the frequency domain vector update information comprises a plurality of groups of frequency domain vector coefficients, and each group of frequency domain vector coefficients of the plurality of groups of frequency domain vector coefficients is configured to be used to perform weighted combination on the first group of frequency domain vectors, to obtain one respective frequency domain vector in the second group of frequency domain vectors; and
   sending the frequency domain vector update information.

3. The method according to claim 2, wherein a frequency of feeding back a space-frequency coefficient is greater than a frequency of feeding back the space domain vector update information and the frequency domain vector update information.

4. The method according to claim 2, wherein the frequency domain vector update information is generated based on space-frequency coefficient information, the space-frequency coefficient information is generated based on at least one group of space-frequency coefficients, the at least one group of space-frequency coefficients corresponds to a first group of space-frequency vectors, each space-frequency vector in the first group of space-frequency vectors is generated based on one respective space domain vector in the first group of space domain vectors and one respective frequency domain vector in the first group of frequency domain vectors, and each group of space-frequency coefficients of the at least one group of space-frequency coefficients is configured to be usable to perform weighted combination on the first group of space-frequency vectors, to obtain a precoding vector.

5. The method according to claim 2, further comprising:
   receiving second indication information, wherein the second indication information indicates a group quantity of the plurality of groups of space domain vector coefficients and a group quantity of the plurality of groups of frequency domain vector coefficients.

6. The method according to claim 2, wherein the space domain vector update information is generated based on space-frequency coefficient information, the space-frequency coefficient information is generated based on at least one group of space-frequency coefficients, the at least one group of space-frequency coefficients corresponds to a first group of space-frequency vectors, each space-frequency vector in the first group of space-frequency vectors is generated based on one respective space domain vector in the first group of space domain vectors and one respective frequency domain vector in the first group of frequency domain vectors, and each group of space-frequency coefficients of the at least one group of space-frequency coefficients is configured to be useable usable to perform weighted combination on the first group of space-frequency vectors, to obtain a precoding vector.

7. The method according to claim 6, wherein each group of space-frequency coefficients of the at least one group of space-frequency coefficients is generated based on a group of received reference signals, and the group of received reference signals is obtained by performing precoding based on the first group of space-frequency vectors.

8. The method according to claim 6, further comprising:
   receiving first indication information, wherein the first indication information indicates a location of each space-frequency vector in the first group of space-frequency vectors in space-frequency space.

9. The method according to claim 1, further comprising:
   receiving second indication information, wherein the second indication information indicates a group quantity of the plurality of groups of space domain vector coefficients.

10. An apparatus, comprising:
    a transceiver;
    at least one processor; and
    one or more non-transitory memories coupled to the at least one processor and storing programming instructions that are executable by the at least one processor to cause the apparatus to:
       generate space domain vector update information, wherein:
          the space domain vector update information is configured to be usable to update a first group of space domain vectors to obtain a second group of space domain vectors,
          the space domain vector update information is generated based on statistics about space domain characteristics of a downlink channel, the space domain vector update information comprises a plurality of groups of space domain vector coefficients, and each group of space domain vector coefficients of the plurality of groups of space domain vector coefficients is configured to be usable to perform weighted combination on the first group of space domain vectors, to obtain one respective space domain vector in the second group of space domain vectors; and send the space domain vector update information.

11. The apparatus according to claim 10, wherein the programming instructions are further executable by the at least one processor to cause the apparatus to:

generate frequency domain vector update information, wherein the frequency domain vector update information is configured to be usable to update a first group of frequency domain vectors to obtain a second group of frequency domain vectors, the frequency domain vector update information comprises a plurality of groups of frequency domain vector coefficients, and each group of frequency domain vector coefficients of the plurality of groups of frequency domain vector coefficients is configured to be usable to perform weighted combination on the first group of frequency domain vectors, to obtain one frequency domain vector in the second group of frequency domain vectors; and send the frequency domain vector update information.

12. The apparatus according to claim 11, wherein the programming instructions are further executable by the at least one processor to cause the apparatus to:

receive second indication information, wherein the second indication information indicates a group quantity of the plurality of groups of space domain vector coefficients and a group quantity of the plurality of groups of frequency domain vector coefficients.

13. The apparatus according to claim 11, wherein the space domain vector update information is generated based on space-frequency coefficient information, the space-frequency coefficient information is generated based on at least one group of space-frequency coefficients, the at least one group of space-frequency coefficients corresponds to a first group of space-frequency vectors, each space-frequency vector in the first group of space-frequency vectors is generated based on one respective space domain vector in the first group of space domain vectors and one respective frequency domain vector in the first group of frequency domain vectors, and each group of space-frequency coefficients of the at least one group of space-frequency coefficients is configured to be used to perform weighted combination on the first group of space-frequency vectors, to obtain a precoding vector.

14. The apparatus according to claim 11, wherein the frequency domain vector update information is generated based on space-frequency coefficient information, the space-frequency coefficient information is generated based on at least one group of space-frequency coefficients, the at least one group of space-frequency coefficients corresponds to a first group of space-frequency vectors, each space-frequency vector in the first group of space-frequency vectors is generated based on one respective space domain vector in the first group of space domain vectors and one respective frequency domain vector in the first group of frequency domain vectors, and each group of space-frequency coefficients of the at least one group of space-frequency coefficients is configured to be used to perform weighted combination on the first group of space-frequency vectors, to obtain a precoding vector.

15. The apparatus according to claim 14, wherein each group of space-frequency coefficients of the at least one group of space-frequency coefficients is generated based on a group of received reference signals, and the group of received reference signals is obtained by performing precoding based on the first group of space-frequency vectors.

16. The apparatus according to claim 14, wherein the programming instructions are further executable by the at least one processor to cause the apparatus to:

receive first indication information, wherein the first indication information indicates a location of each space-frequency vector in the first group of space-frequency vectors in space-frequency space.

17. The apparatus according to claim 14, wherein a frequency of feeding back a space-frequency coefficient is greater than a frequency of feeding back the space domain vector update information and the frequency domain vector update information.

18. The apparatus according to claim 10, wherein the programming instructions are further executable by the at least one processor to cause the apparatus to:

receive second indication information, wherein the second indication information indicates a group quantity of the plurality of groups of space domain vector coefficients.

19. A computer-readable storage medium, comprising a computer program, wherein when the computer program is run on a computer, the computer is enabled to perform the following operations:

generate space domain vector update information, wherein:

the space domain vector update information is configured to be usable to update a first group of space domain vectors to obtain a second group of space domain vectors, the space domain vector update information is generated based on statistics about space domain characteristics of a downlink channel, the space domain vector update information comprises a plurality of groups of space domain vector coefficients, and each group of space domain vector coefficients of the plurality of groups of space domain vector coefficients is configured to be used to perform weighted combination on the first group of space domain vectors, to obtain one space domain vector in the second group of space domain vectors; and send the space domain vector update information.

20. The computer-readable storage medium according to claim 19, wherein when the computer program is run on a computer, the computer is enabled to perform the following further operations:

generate frequency domain vector update information, wherein the frequency domain vector update information is configured to be usable to update a first group of frequency domain vectors to obtain a second group of frequency domain vectors, the frequency domain vector update information comprises a plurality of groups of frequency domain vector coefficients, and each group of frequency domain vector coefficients of the plurality of groups of frequency domain vector coefficients is configured to be usable to perform weighted combination on the first group of frequency domain vectors, to obtain one frequency domain vector in the second group of frequency domain vectors; and send the frequency domain vector update information.

\* \* \* \* \*

UNITED STATES PATENT AND TRADEMARK OFFICE
CERTIFICATE OF CORRECTION

PATENT NO. : 12,418,905 B2  
APPLICATION NO. : 17/934693  
DATED : September 16, 2025  
INVENTOR(S) : Wang et al.

Page 1 of 1

It is certified that error appears in the above-identified patent and that said Letters Patent is hereby corrected as shown below:

In the Claims

In Column 56, in Claim 6, Line 33, after "to be" delete "useable".

Signed and Sealed this
Eleventh Day of November, 2025

John A. Squires
*Director of the United States Patent and Trademark Office*